United States Patent [19]

Weaver et al.

[11] Patent Number: 6,022,944
[45] Date of Patent: Feb. 8, 2000

[54] ANTHRAQUINONE AND CONDENSED ANTHRAQUINONE COLORANTS HAVING SULFONAMIDE LINKED POLY (OXYALKYLENE) MOIETIES AND THEIR PREPARATION

[75] Inventors: Max Allen Weaver, Kingsport, Tenn.; Edward William Kluger, Pauline; David Jesse Moody, Spartanburg, both of S.C.

[73] Assignee: Milliken & Company, Spartanburg, S.C.

[21] Appl. No.: 07/888,268

[22] Filed: May 22, 1992

Related U.S. Application Data

[63] Continuation of application No. 07/578,107, Sep. 5, 1990, abandoned.

[51] Int. Cl.$^7$ .................................................. C08G 75/18
[52] U.S. Cl. ............................................ 528/391; 528/332
[58] Field of Search ................................ 528/332, 391

[56] References Cited

U.S. PATENT DOCUMENTS

| | | | |
|---|---|---|---|
| 4,245,018 | 1/1981 | Hara et al. | 524/168 |
| 4,640,690 | 2/1987 | Baumgartner et al. | 8/506 |
| 4,996,284 | 2/1991 | Mallavarapu | 528/391 |
| 5,001,175 | 3/1991 | Skora | 528/391 |
| 5,240,464 | 8/1993 | Kluger et al. | 8/506 |
| 5,270,363 | 12/1993 | Kluger et al. | 524/90 |

FOREIGN PATENT DOCUMENTS

| | | | |
|---|---|---|---|
| 63-264674 | 11/1988 | Japan . | |
| 2018471 | 1/1990 | Japan | 524/168 |
| 1477396 | 9/1974 | United Kingdom | C09B 43/00 |
| 1477396 | 6/1977 | United Kingdom . | |

*Primary Examiner*—Kriellion Sanders
*Attorney, Agent, or Firm*—Terry T. Moyer; Timothy J. Monahan

[57] ABSTRACT

The process for chemically modifying metal-free, colored anthraquinone or condensed anthraquinone compounds or the compounds prepared by said process for improving one or more properties thereof such as water dispersibility, compatibility with other organics, or increased chemical reactivity, wherein the process includes providing material with from 1–6 sulfonylhalide groups or sulfonate ester groups or mixtures thereof, and contacting the material under sulfonamido forming conditions with one or more reactants containing one or more poly(oxyalkylene) moieties, each of the reactants having from 1 to 4 functional amine groups, and each of the poly(oxyalkylene) moieties being comprised of from about 4 to about 200 epoxide reactant residues at least about 50 mole percent of which residues contain 2–4 carbons and wherein the total of said epoxide reactant residues is from about 4 to about 600.

13 Claims, No Drawings

ANTHRAQUINONE AND CONDENSED ANTHRAQUINONE COLORANTS HAVING SULFONAMIDE LINKED POLY (OXYALKYLENE) MOIETIES AND THEIR PREPARATION

This application is a continuation of Ser. No. 07/578,107 filed Sep. 5, 1990 and now abandoned.

FIELD OF INVENTION

This invention concerns organic materials particularly metal free organic compounds which are anthraquinone and condensed anthraquinone colorants, which compounds have linked thereto through sulfonamido groups, one or more poly(oxyalkylene) moieties which impart to or improve one or more chemical or physical properties of the compounds such as liquidity, solvent solubility, compatibility with liquids, with thermosettable resinous materials, or with thermoplastic polymeric materials, primary hydroxyl enrichment# hydroxyl reactivity enchancement, branching density or melting point lowering.

The utility and desirability in a general sense for incorporating certain poly(oxyalkylene) materials into organic compounds, particularly into colorant compounds, are disclosed in the literature such as in U.S. Pat. Nos.: 4,761,502; 4,284,729; 4,751,254; 4,812,141; 4,167,510; 4,141,684; 3,157,633; and 4,640,690, the disclosures of which are hereby incorporated by reference. All of these patents teach the linking of the poly(oxyalkylene) moiety to the chromophore through amino groups since the standard method for associating the poly(oxyalkylene) with a compound is through the reaction of the epoxy reactant with an amino group on the compound. However, such a reaction is not always convenient as such amino groups are not easily placed on many organic compounds.

In regard to the new colorant compositions of the present invention, an important utility for one embodiment is for the tinting or deeper coloring of natural and synthetic polymeric or resinous materials or substrates, especially polyurethanes and other thermosetting resins and polyolefins, wherein the chemical structures of the colorants are readily tailored to meet, in exceptional manner, the physical and chemical requirements of the specific industrial application.

Some of the desired physical and chemical characteristics of such colorants, in addition to having at least substantial tinctorial power, include one or more of excellent clarity and light fastness, high heat stability, crystal structure and shade immutability, availability as liquids or at least good resin compatibility at processing temperatures for easy blending with the substrate, easy clean-up from processing, homogeneity of dispersal in the substrate, non-nucleating propensity of the colorant, and resistance to migration, settling, streaking, plating, subliming, blooming and the like of the colorant from the substrate.

The present organic materials on the other hand, for the most part are polymeric, amorphous liquids and the liquid colorant system eliminates the dusting problems from various substrates. The polymeric nature also makes the colorant more compatible with the various cleaning chemicals due to its unique internal emulsifying constituents.

Objects therefore of the present invention are: to provide organic materials, especially colorants which are improved in one or more properties such as liquidity, solvent solubility, pH stability, compatibilty with liquids, with thermosetting materials, or with thermoplastic materials, primary hydroxyl enrichment, hydroxyl reactivity enchancement, or melting point lowering; or non-fiber or non-skin staining; and to provide a highly simplified method for their manufacture.

SUMMARY OF THE INVENTION

These and other objects have been attained in accordance with the present invention defined in its process embodiment as the process for chemically modifying metal-free, organic material for improving one or more properties thereof such as water dispersibility, compatibility with other organics, or increased chemical reactivity, said process comprising providing said material having from 1–6 sulfonylhalide groups or sulfonate ester groups or mixtures thereof, and contacting the same under sulfonamido forming conditions with one or more reactants containing one or more poly(oxyalkylene) moieties, each said reactant having from 1 to 4 functional amine groups, and each said poly(oxyalkylene) moiety being comprised of from about 6 to about 200 epoxide reactant residues of 2–4 carbons.

In certain preferred embodiments:

said poly(oxyalkylene) moiety contains a total of from about 3.0 to about 30 mole percent of epoxide residue linking groups selected from one or more of divalent or trivalent, straight or branched aliphatic hydrocarbon of 2–15 carbons, alkylenedioxy, alkylenetrioxy, or groups containing one or more of N, O or S or combinations thereof;

said residue linking groups are selected from —$NR_1$—, $NR_1SO_2NR_1$— or —NH—C(=O)—NH—, wherein $R_1$ is selected from hydrogen, a poly(oxyalkylene) moiety as defined, or unsubstituted or substituted alkyl, aryl, or cycloalkyl; said amine groups have the formula HN($R_1$)— wherein $R_1$ is selected from hydrogen, a poly(oxyalkylene) moiety as defined, or unsubstituted or substituted alkyl, aryl, or cycloalkyl; and said organic material contains one or more of the unsubstituted or substituted reaction residues of anthraquinone or condensed anthraquinone compounds. Certain other preferred embodiments of the method and composition are given in the appended claims.

In the above definitions, Y can be terminated by H, or by or contain as branch substituents, 1–3 groups or moieties selected from alkyl, cycloalkyl, acyl, or aryl; any of the above recited hydrocarbon groups, moieties or substituents may themselves be substituted, for example, or may contain multiple substituents selected from alkyl, halogen, alkoxycarbonyl, hydroxy alkoxy, alkylenedioxy, urea or substituted urea, amino or substituted amino, acylamino or substituted acylamino, acyloxy or the like substituents which are known in the art; and each aliphatic hydrocarbon portion or moiety of the groups, moieties or substituents recited above, where not otherwise specified, contains from 1–20, preferably 1–12 carbons. In certain preferred embodiments however, it is preferred that the poly(oxyalkylene) moiety carries substantial hydroxyl functionality, and for certain utilities the hydroxyl functionality is most preferably patterned in a more dense manner.

It is noted and is shown in the various examples of the preformed poly(oxyalkylene) containing reactants that the poly(oxyalkylene) moieties which naturally terminate with hydrogen at the end of the epoxide polymerization have been reacted further with materials such as ammonia. Also, additional groups can be added during poly(oxyalkylene) preparation by -selection of the various nucleophiles to be reacted with the epoxide reactants.

Also such groups, e.g., ketals may be subsequently hydrolyzed and further reacted such as acylation, or amination. Such nucleophiles are shown in the reactant examples given below. Such groups are exemplified by alkoxy, phenoxy, dihydroxyalkyl, hydroxyalkyl, cyclic acetal (dihydroxy compound reacted with ketone), aminoaklyl, acyloxyalkyl or diacyloxyalkyl.

It is noted that one of the primary purposes of the present invention is to provide polymeric colorants which color thermoplastic and thermosetting resins without settling, streaking, subliming, or migrating and which provide uniform coloring throughout the entire resin. Also, the present polymeric colorants often provide improved clarity over conventional pigments. In addition, it is highly desirable that the colorants be easily removed from the equipment used to add the colorant to the resin. We have found the present colorants can be used to color homogeneously a variety of thermoplastics and thermosetting resins and that aqueous cleaning is greatly facilitated as compared to conventional colorants.

DISCUSSION OF PRIOR ART

U.S. Pat. No. 2,730,534 shows anthraquinone dyestuffs useful for dyeing textile fibers and which contain —$SO_2NH(CH_2CH_2O)_n$—H groups where n equals 1, 2 or 3. These compounds, however, are solids and quite insoluble in water and thus are primarily useful as disperse dyestuffs.

Also, it is known to prepare polymeric colorants containing sulfonamido groups which link the chromophore to a polymeric portion (See U.S. Pat. Nos. 4,051,038; 4,144,252; 4,167,422).

In these compounds, however, the polymeric portion compound consists of a polyvinyl amine residue and exhibit poor solubility in water. Thus, they must be reacted further to incorporate additional sulfonic groups thereinto for enhancing their water solubility.

In regard to the prior art polymeric colorants being solids, the liquid nature of the present compounds allows them to be blended uniformly into a variety of thermoplastic or thermosetting resins. In contrast, the solid prior art colored polymeric compositions need to be converted into fine particles, dispersed properly in some medium and then blended homogeneously with the resin to be colored.

STATEMENT OF MORE SPECIFIC EMBODIMENTS OF INVENTION

More specific aspects of the invention include that the colorant contain one or more of the unsubstituted or substituted reaction residues of anthraquinone or condensed anthraquinone compounds.

Furthermore, it is preferred that the metal-free polymeric colorant have the formula $A[SO_2N(R_1)—(Y)]_{1-6}$ and exhibit one or more improved properties of water dispersibility, compatibility with other organics, or increased chemical reactivity, wherein:

A is an anthraquinone or condensed anthraquinone, substituted or unsubstituted colored chromophoric radical; and Y is an unsubstituted or substituted polymeric segment of from about 30 to 100 weight percent total of one or more poly(oxyalkylene) moieties each of which is comprised of the reaction residues of from about 4 to about 200 epoxide reactants at least about 50 mole percent of which contain 2–4 carbons; wherein the total of all said reaction residues is from about 4 to about 600; and $R_1$ is selected from hydrogen, Y, unsubstituted or substituted alkyl, aryl or cycloalkyl or RI in combination with Y and N completes a 5–7 membered ring.

In another preferred embodiment of the invention metal-free polymeric colorant has the formula $A[SO_2—X—(Y)_{1-2}]_{1-6}$ wherein X is selected from the formulae:

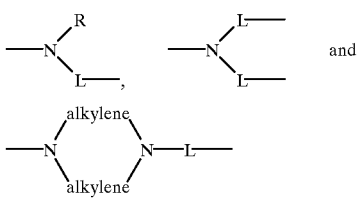

wherein R is hydrogen, optionally substituted lower alkyl, cycloalkyl, aryl or —Y;

L is a linking group selected from a covalent bond, alkylene, arylene, cycloalkylene, arylene-alkylene, alkylene-arylene-alkylene, alkylene-cycloalkylene, alkenylene, alkynylene, alkylene-Z-, arylene-Z-, aralkylene-Z-, alkylene-Z-alkylene-Z-, alkylene-Z-arylene-Z- or arylene-Z-arylene-Z-;

Z is selected from —O—, —S—, —$SO_2$—, —N($R_2$)—, —$SO_2$—N($R_2$)— or —CON($R_2$)—;

$R_2$ is hydrogen, optionally substituted alkyl, aryl, cycloalkyl or —Y;

wherein each Y independently consists of 4 to 200 residues of —$CH_2CH_2O$—, —$CH_2$—$CH(CH_3)O$—, or —$CH_2$—$CH(C_2H_5)O$— or mixtures thereof, and wherein each Y is terminated independently with a moiety selected from hydrogen, unsubstituted or substituted alkyl, cycloalkyl, aryl, acyl or

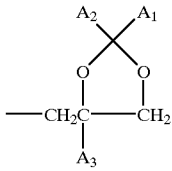

wherein each of $A_1$, $A_2$, and $A_3$ is independently selected from hydrogen, alkyl, or aryl; and wherein said poly (oxyalkylene) moiety contains from about 3 to about 30 mole percent of epoxide reactant residue linking groups selected from divalent or trivalent, straight or branched aliphatic hydrocarbon of 2–15 carbons, alkylenedioxy, alkylenetrioxy, or groups containing one or more of N, O or S or combinations thereof;

wherein said linking groups are selected from —$NR_2$—, —$NR_2SO_2NR_2$—, or —NHCONH—; $R_2$ is hydrogen, —Y, unsubstituted or substituted alkyl, cycloalkyl or aryl; and wherein said poly(oxyalkylene) moiety is subsitituted with one or two A—$SO_2N(R_1)$— groups;

wherein —A represents a colored anthraquinone radical optionally substituted with one or more groups selected from lower alkyl, lower alkoxy, aryloxy, aralkyloxy, lower alkylthio, arylthio, lower alkylsulfonyl, arylsulfonyl, halogen, cyano, trifluoromethyl, aryl, amino, N-alkylamino, N-allylamino, N-arylamino, N-cycloalkylamino, alkanoyl, aroyl, lower alkanoylamino, N-aroylamino, lower alkylsulfonylamino, arylsulfonylamino, alkoxycarbonylamino, ureido, alkylureido, arylureido, nitro, hydroxy, sulfamoyl, N-alkylsulfamoyl, N,N-dialkylsulfamoyl, carbamoyl, N-alkylcarbamyl, N,N-dialkylcarbamyl, N-arylcarbamyl, acyloxy, alkoxycarbonyl and thiocyano; wherein each of the above alkyl, alkylene, aryl, arylene, cycloalkyl and cycloalkylene moieties or portions of a group or radical may be futher substituted with the following: halogen, hydroxy, alkoxy, cyano, alkoxycarbonyl, aryl, aryloxy, lower alkylthio, arylthio, hydroxyalkyoxy, succinimido, phthalimido, phthalimidino, 2-pyrrolidino, cycloalkyl, acylamino, acyloxy, lower alkylsulfonyl, arylsulfonyl, carbamyl, and alkoxycarbamyloxy;

Other preferred colorants are those wherein A is the reaction residue of a condensed anthraquinone compound selected from unsubstituted or substituted: from 3H-dibenzo[f,ij]-isoquinoline-2,7-diones, (anthrapyridones), 7H-dibenz[f,ij]-isoquinoline-7-ones (anthrapyridines), 7H-benzo[e]perimidin-7-ones (anthrapyrimidines), 14H-naphtho[2,3-a]phenothiazine-8,13-diones (phthaloylphenothiazines), 14H-naphtho[2,3-a]-phenothiazine-8,13-dione-8,8-dioxides, 1H-anthra[2,1-b](1,4)-thiazine-7,12-diones and S,S-dioxides, 14H-naphtho[2,3-a]-phenoxazine-8,13-diones (phthaloylphenoxazines), 7H-benz[de]anthracene-7-ones (benzanthrones), 13H-naphtho-[2,3-c]acridine-5,8,14-triones (phthaloylacridones), 8H-naphtho[2,3-c]thiaxanthene-5,8,14-triones, anthrapyridazones, anthrapyrazoles, anthraisothiazoles and naphtho[1',2',3',:4,5]-quino[2,1-b]quinazoline-5,10-diones; wherein —A may be optionally substituted with one or more groups selected from lower alkyl, lower alkoxy, aryloxy, aralkyloxy, lower alkylthio, arylthio, lower alkylsulfonyl, arylsulfonyl, halogen, cyano, trifluoromethyl, aryl, amino, N-alkylamino, N-allylamino, N-arylamino, N-cycloalkylamino, alkanoyl, aroyl, lower N-alkanoylamino, N-aroylamino, lower alkylsulfonylamino, arylsulfonylamino, alkoxycarbonylamino, ureido, alkylureido, arylureido, nitro, hydroxy, sulfamoyl, alkylsulfamoyl, dialkylsulfamoyl, carbamoyl, alkylcarbamyl, arylcarbamyl, acyloxy, alkoxycarbonyl and thiocyano; wherein each of the above alkyl, alkylene, aryl, arylene, cycloalkyl and cycloalkylene moieties or portions of a group or radical may be futher substituted with the following: halogen, hydroxy, alkoxy, cyano, alkoxycarbonyl, aryl, aryloxy, lower alkylthio, arylthio, hydroxyalkyoxy, succinimido, phthalimido, phthalimidino, 2-pyrrolidino, cycloalkyl, acylamino, acyloxy, lower alkylsulfonyl, arylsulfonyl, unsubstituted or substituted carbamyl, or N-alkylcarbamyloxy or alkoxycarbamyloxy. A group of particularly useful anthraquinone and condensed anthraquinone colorants are wherein —A is selected from those optionally substituted residues of the formulae

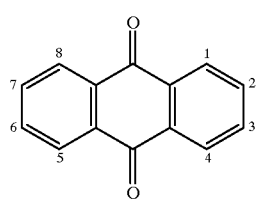

Anthracene-9-10-dione
(Anthraquinone)

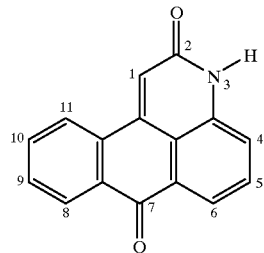

3H-Dibenz [f, ij]-
isoquinoline-2, 7-dione
(Anthrapyridone)

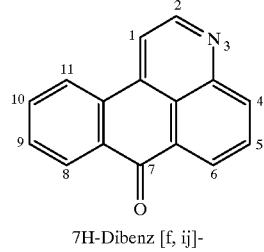

7H-Dibenz [f, ij]-
isoquinoline-7 one
(Anthrapyridine)

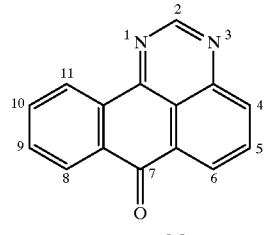

7H-Benzo [e]-
perimidine-7-one
(Anthrapyrimidine)

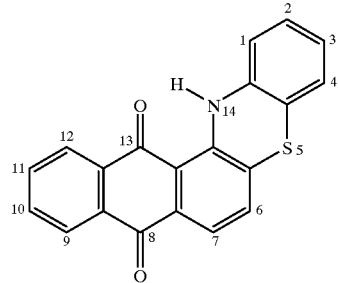

14H-Naphto [2, 3-a]-
phenothiazine-8, 13-dione
(Phthaloylphenothiazine)

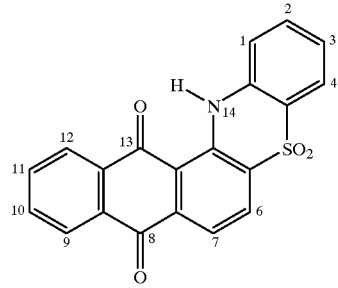

14H-Naphtho [2, 3-a]-
phenothiazine-
8, 13-dione-S, S-dioxide

-continued

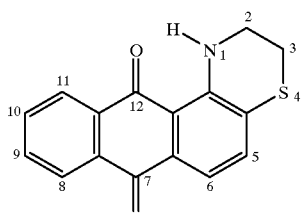

1H-Anthra [2, 1-b]-
(1, 4)-thiazine-7, 12-
dione

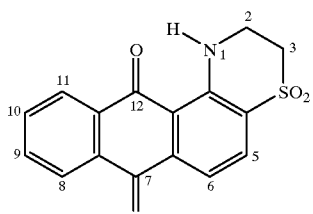

1H-Anthra [2, 1-b]-
(1, 4)-thiazine-
7, 12-dione-S, S-dioxide

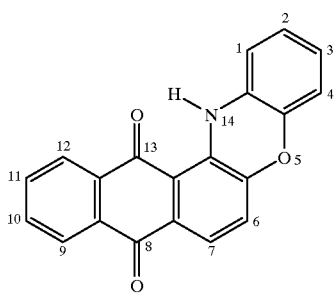

14H-Naphtho [2, 3-a]-
phenoxazine-8, 13-dione
(Phthaloylphenoxazine)

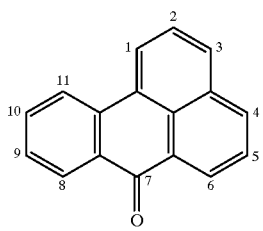

7H-Benz [de]-
anthracene-7-one
(Benzanthrone)

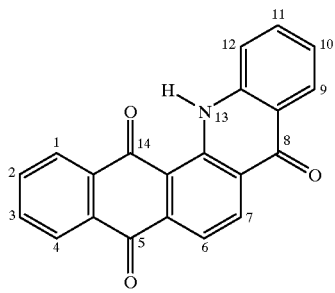

13H-Naphth [2, 3-c]-
acridine-5, 8, 14-trione
(Phthaloylacridone)

-continued

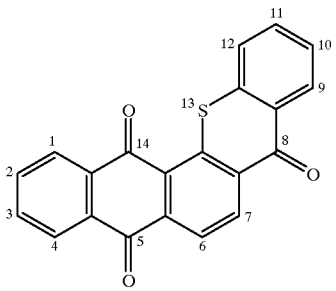

8H-Naphtho [2, 3-c]-
thiaxanthene-
5, 8, 14-trione

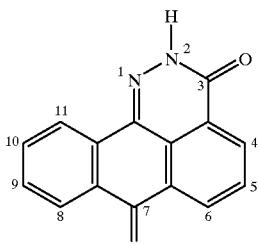

Anthrapyridazone

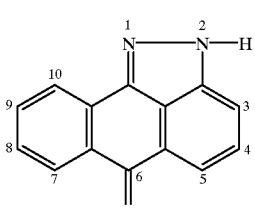

Anthrapyrazole

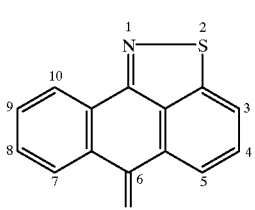

Anthraisothiazole

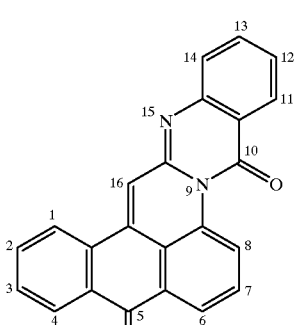

Naptho [1', 2', 3':4, 5]-
quino [2, 1-b] quinazoline-
5, 10-dione

The particularly useful A moieties described above are linked through (—B—Ar—) to Y and have the formulas

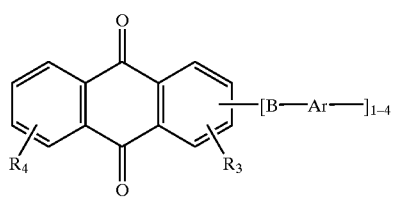
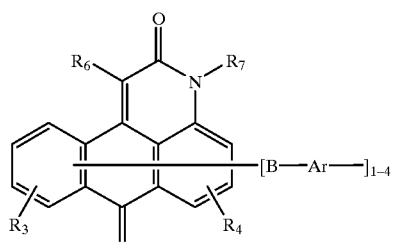
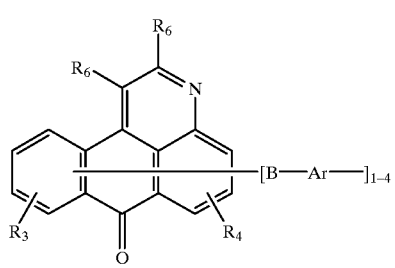
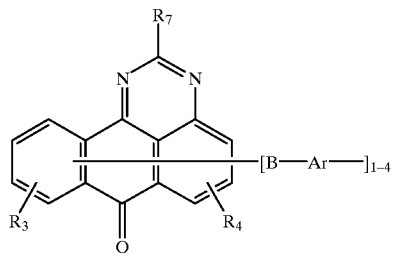
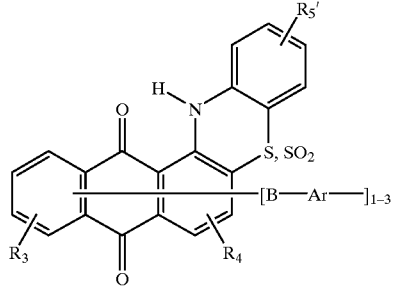
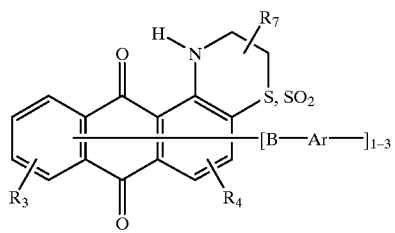
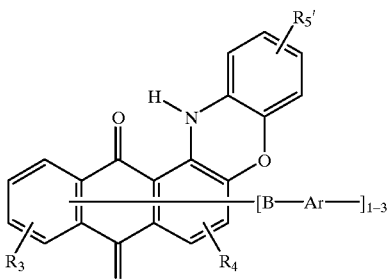
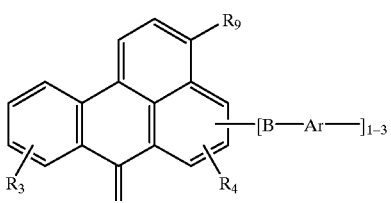
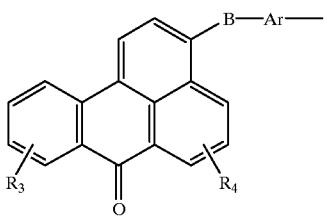
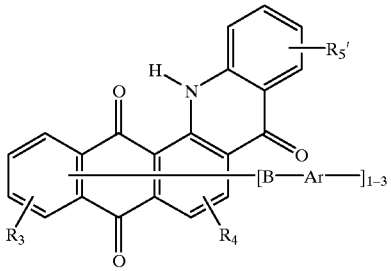
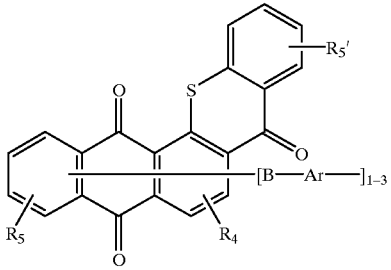
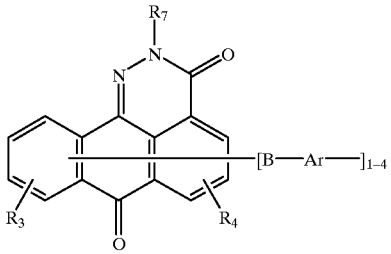

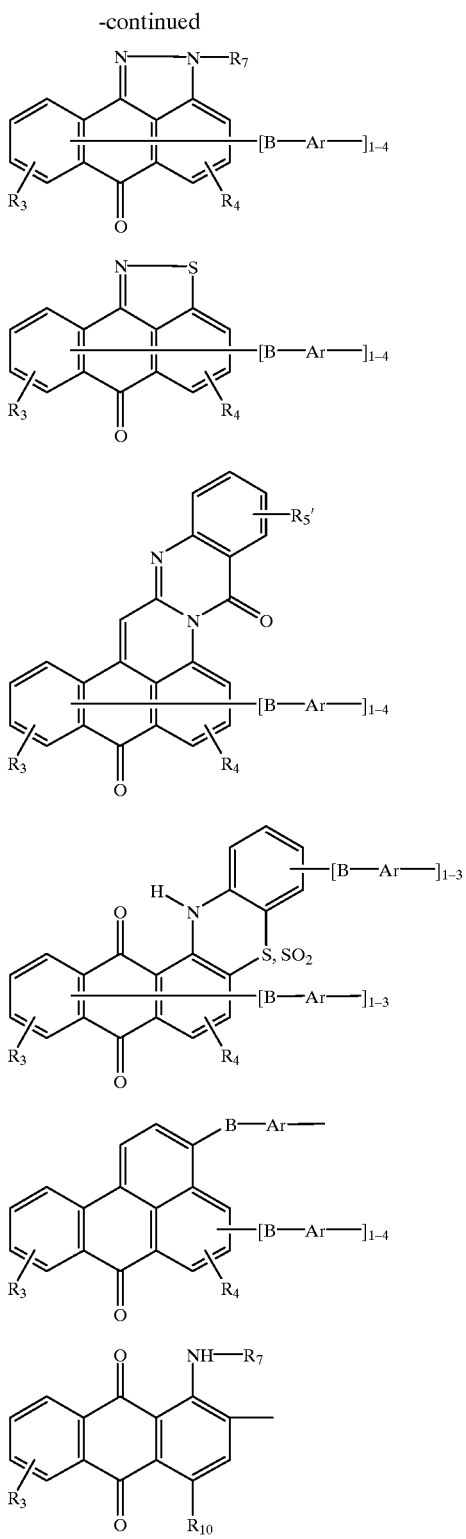

wherein —Ar is selected from unsubstituted or substituted phenylene, naphthalene-diyl, biphenyl-diyl, quinoline-diyl, thiophene-diyl, furan-diyl, benzofuran-diyl, benzothiophene-diyl, pyrene-diyl, indol-diyl, or groups of the formula wherein Q is selected from —O—, —S—, —SO$_2$—, imino, alkylimino, or —CH$_2$—;

wherein R$_3$ and R$_4$ each represent hydrogen, or 1–2 substituents independently selected from lower alkyl, lower alkoxy, amino, lower N-alkylamino, optionally substituted lower N-alkylamino, optionally substituted N-arylamino, N-cycloalkylamino, lower alkylsulfonyl, arylsulfonyl, lower alkylsulfonylamino, arylsulfonylamino, lower alkylanoylamino, aroylamino, lower alkylthio, arylthio, alkanoyl, aroyl, triflouromethyl, cyano, halogen, nitro, hydroxy, sulfamoyl, N-alkylsulfamoyl, N,N-dialkylsulfamoyl, N-arylsulfamoyl, carbamoyl, N-alkylcarbamoyl, N,N-dialkylcarbamoyl, N-arylcarbamoyl, aryloxy, alkoxycarbonyl or thiocyano;

R$_5$' is hydrogen or 1–3 substituents independently selected from lower alkyl, lower alkoxy, acyloxy, cyano, halogen, alkanoylamino, aryloxy, lower alkylthio, arylthio, alkoxycarbonyl, aryl or trifluoromethyl;

R$_6$ is hydrogen, lower alkyl, aryl, cyano, carbamoyl, N-alkylcarbamoyl, N,N-dialkylcarbamoyl, alkoxycarbonyl, acyl, aroyl, amino, lower N-alkylamino, N-arylamino, N-cycloalkylamino, halogen, lower alkylthio, arylthio, alkylsulfonyl, arylsulfonyl, alkoxy or aryloxy;

R$_7$ is hydrogen, cycloalkyl, aryl, and lower alkyl substituted with hydroxy, halogen, alkoxy, phenyl, cycloalkyl, or acyloxy;

R$_8$ is amino, N-alkylamino, N,N-dialkylamino, N-arylamino, N-cycloalkylamino, N-alkyl-N-arylamino, piperidino or N-morpholino;

14 is hydrogen, lower alkyl, aryl, halogen, lover alkoxy, aryloxy, alkylthio, arylthio, amino, N-alkylamino or N-arylamino;

R$_{10}$ is amino, N-alkylamino, N-arylamino, N-cycloalkylamino, hydroxy, lower alkylthio, arylthio, alkanoylamino, N-arylamino, lower alkylsulfonylamino or arylsulfonylamino;

B is a covalent linking group selected from —O—, —O—, —N(R$_{11}$)—, —S—R$_{12}$—, —S—R$_{12}$—S—, —S—R$_{12}$—O—, —S—R$_{12}$—S—R$_{12}$—, —N(R$_{12}$)—R$_{12}$—O—, —N(R$_{11}$)—R$_{12}$—N(R$_{11}$)—, —N(R$_{11}$)—R$_{12}$—O—R$_{12}$—, —N(R$_{11}$)—R$_{12}$—S—, —N(R$_{11}$)—R$_{12}$—S—R$_{12}$—, —O—R$_{12}$—O—, —O—R$_{12}$—, —O—R$_{12}$—O—R$_{12}$—, —O—R$_{12}$—O—R$_{12}$—O—, —O—R$_{12}$—S—R$_{12}$— or a covalent bond;

R$_{11}$ is hydrogen, or selected from lower alkyl, cycloalkyl, aryl, lower alkylsulfonyl or arylsulfonyl;

R$_{12}$ is alkylene, arylene and cycloalkylene; wherein the lower alkylene, lower alkyl, cycloalkyl, aryl and arylene moieties of the above R$_3$–R$_{12}$ groups are unsubstituted or substituted with 1–3 of the following: halogen, hydroxy, lower alkoxy, cyano, alkoxycarbonyl, aryl, alkythio, arylthio, hydroxyalkoxy, succinimido, phthalimido, phthalimidino, 2-pyrrolidino, aryloxy, alkylsulfonyl, arylsulfonyl, carbamoyl, cycloalkyl, acyl, acylamino, and alkoxycarbonyloxy; wherein in the above definitions, the alkyl and alkylene groups are straight or branched chains containing 1 to about twelve carbon atoms; the aryl groups are selected from unsubstituted or substituted: phenyl, benzothiazolyl, benzoxazolyl, thiazolyl, benzimidozolyl, 1,3,4-thiadiazolyl, 1,2,4-thiadiazolyl, 1,3,4-ozadiazolyl, naphthyl, pyridyl, quinolyl or pyrimidinyl.

Another embodiment is the process for preparing a colored metal free, anthraquinone or condensed anthraquinone chromphore of formula $A[SO_2N(R_1)-Y]_{1-6}$ comprising reacting at a temperature of from about 0° to 100° C., an anthraquinone or condensed anthraquinone of the formula $A_1[SO_2X]_{1-6}$, with at least a stoichiometric quantity of an amine of the formula $HN(R_1)Y$ wherein $X_1$ is selected from Cl, P, Br, I or alkoxy, A is the residue of an anthraquinone or condensed anthraquinone and A, $R_1$, and Y are as defined above.

PRACTICE OF THE INVENTION, MATERIALS, REACTION CONDITIONS AND EXAMPLES

The types of polymeric colorants to which the present invention is applicable are essentially limited only by the practicality of providing the material with one or more halogenosulfonyl or sulfonate ester groups without adversely affecting the properties of or deteriorating the material.

The halogenosulfonation of these materials may be done on the colorant by any of the known halogenosulfonation methods.

The halosulfonyl colorants may also be prepared from the colorant sulfonic acids or salts thereof by reacting with known halogenating agents such as phosphorous pentachloride, phosphorous trichloride, phosphorous oxychloride, phosphorous tribromide, phosphorous oxybromide or thionyl chloride or mixtures thereof. A convenient synthetic method for preparing 2-(flurosulfonylethyl) compounds involves the reaction of known vinylsulfonyl fluoride with organic compounds, e.g., anilines and aminoanthraquinones.

The colorant sulfonate ester containing reactants may be prepared by reaction of the corresponding halosulfonyl compounds with alkali metal alkoxides (e.g. sodium methoxide) or with alcohols in the presence of base to generate the alkoxide "in situ".

In general, the colorant containing one or more of said sulfonylhalide groups are reacted with amine reactants containing the poly(oxyalkylene) moiety by combining the two reactants in roughly equal stoichiometric amounts or with a slight excess of the amine reactant at temperatures from about 0–100° C., with temperatures of about 30–60° C. being preferred. Reaction solvents include water, alcohols, ketones, glycols, glycol others, pyridine, N,N-dimethylformamide, N-methyl-2-pyrrolidinone, ethers or mixtures thereof, preferably with an acid acceptor present such as alkali hydroxides, alkali carbonates, alkali bicarbonates, or tertiary amines.

Commercially available and preferred amines from which the present preferred colorants are prepared are the JEFFAMINE series described in Texaco Chemical Company, New Product Development brochures as the M, D, ED, DU, BUD, T, MNPA: and EDR series: the disclosures of which are incorporated herein by reference and copies of which are transmitted herewith.

The preferred amines finding special utility in the present invention are as follows:

P—O($C_2H_4$O)$_a$[$CH_2CH(CH_3)$O]$_b$$CH_2CH(CH_3)NH_2$
P—O($C_2H_4$O)$_a$[$CH_2CH(C_2H_5)$O]$_b$$CH_2CH(CH_3)NH_2$
P—O($C_2H_4$O)$_a$[$CH_2CH(C_2H_5)$O]$_b$$CH_2CH(C_2H_5)NH_2$
P—O($C_2H_4$O)$_a$[$CH_2CH(CH_3)$O]$_b$$CH_2CH(C_2H_5)NH_2$
P—O[$CH_2CH(CH_3)$O]$_a$$CH_2CH(CH_3)NH_2$
P—O[$CH_2CH(C_2H_5)$O]$_a$$CH_2CH(C_2H_5)NH_2$
P—O[$CH_2CH(C_2H_5)$O]$_a$$CH_2CH(CH_3)NH_2$
P—O[$CH_2CH(CH_3)$O]$_a$$CH_2CH(C_2H_5)NH_2$ wherein a=1–19; b=2–31; and P is selected from $CH_3$, $C_2H_5$, n—$C_3H_7$, n—$C_4H_9$, n—$C_5H_{11}$, or n—$C_6H_{13}$.

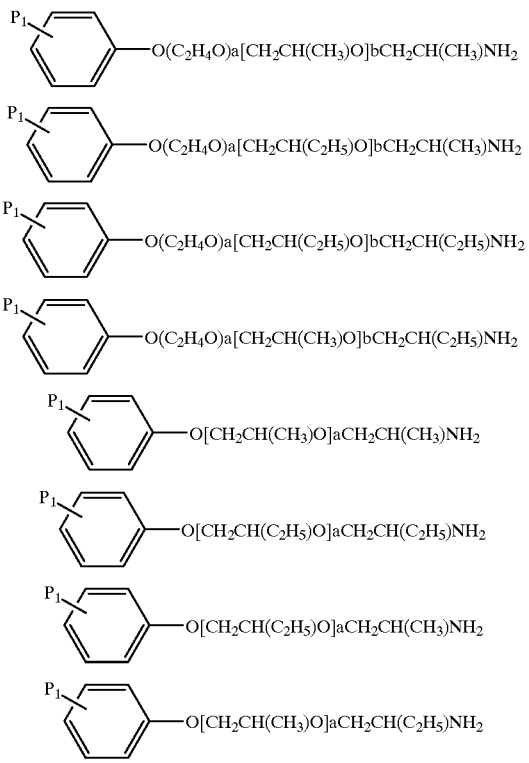

wherein a=1–19; b=2–31; and $P_1$ is selected from $CH_3$, $C_2H_5$, $C_4H_9$, $C_9H_{19}$, $OCH_3$, $OC_2H_5$, or $OC_4H_9$.

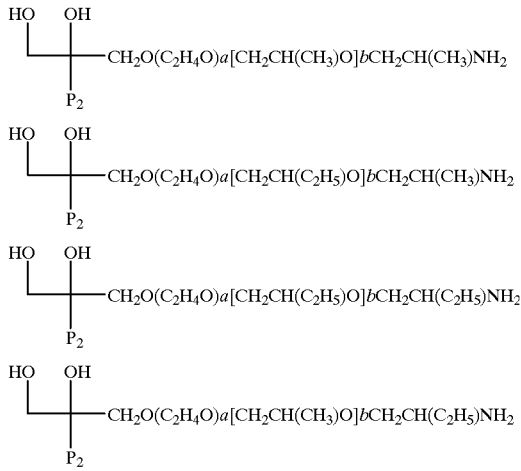

-continued
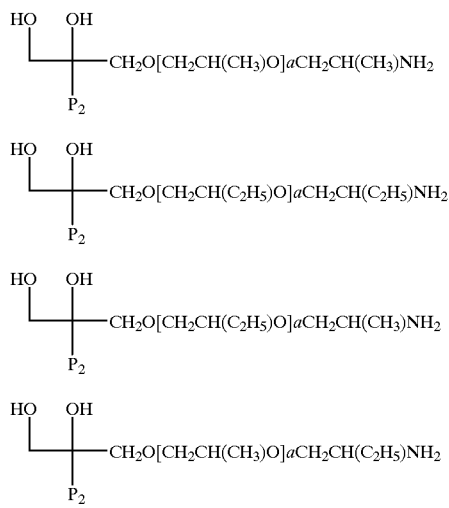
wherein a=1–19; b=2–31; and $P_2$ is selected from hydrogen, $CH_3$, or $C_2H_5$.
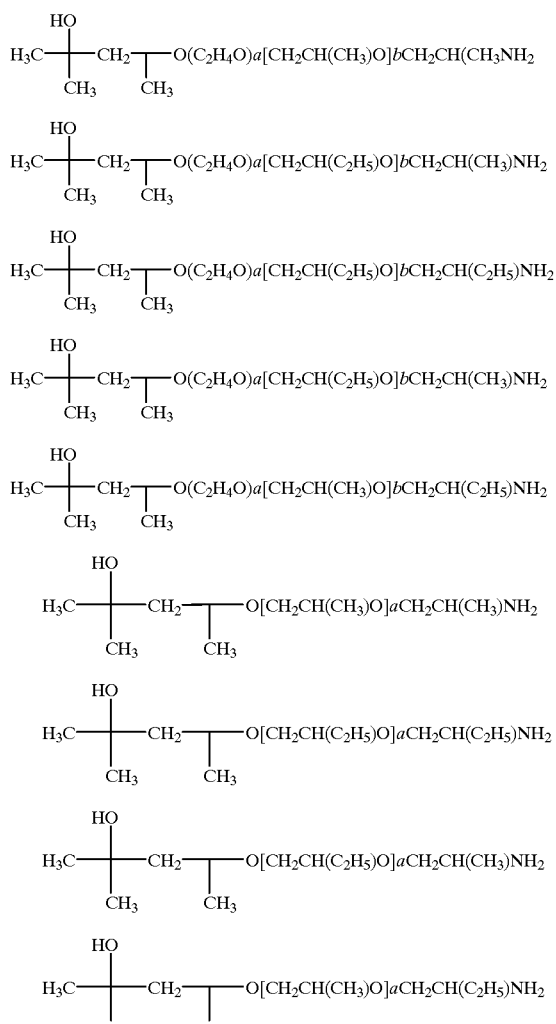
wherein a=1–19; b=2–31.
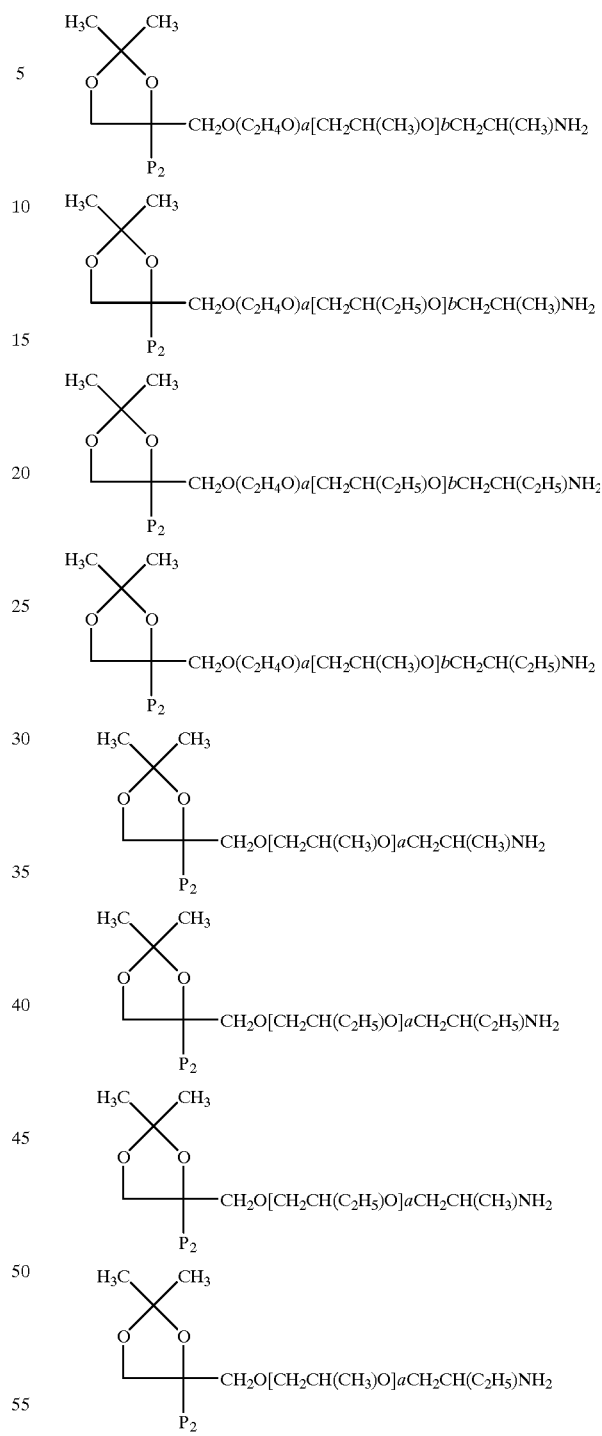
wherein a=1–19; b=2–31; and $P_2$ is recited above.
$H_2NCH(CH_3)CH_2[OCH(CH_3)CH_2]_a(OCH_2CH_2)_b[OCH_2CH(CH_3)]_cNH_2$
$H_2NCH(CH_3)CH_2[OCH(C_2H_5)CH_2]_a(OCH_2CH_2)_b[OCH_2CH(CH_3)]_cNH_2$
$H_2NCH(CH_3)CH_2[OCH(C_2H_5)CH_2]_a(OCH_2CH_2)_b[OCH_2CH(C_2H_5)]_cNH_2$
$H_2NCH(C_2H_5)CH_2[OCH(C_2H_5)CH_2]_a(OCH_2CH_2)_b[OCH_2CH(C_2H_5)]_cNH_2$ $H_2NCH(C_2H_5)CH_2[OCH(CH_3)CH_2]_a(OCH_2CH_2)_b$
   $[OCH_2CH(C_2R_5)]_cNH_2$
$H_2NCH(CH_3)CH_2[OCH(CH_3)CH_2]_aNH_2$
$H_2NCH(C_2H_5)CH_2[OCH(C_2H_5)CH_2]_aNH_2$ wherein b=4–132; and a+c=2–5.

$H_2N(CH_3)CHCH_2[OCH_2CH(CH_3)]_aHN(CO)NH[CH(CH_3)$
   $CH_2O]_bCH_2CH(CH_3)NH_2$
$H_2N(C_2H_5)CHCH_2[OCH_2CH(C_2H_5)]_aHN(CO)NH[CH$
   $(C_2H_5)CH_2O]_bCH_2CH(C_2H_5)NH_2$
$H_2N(CH_3)CHCH_2[OCH_2CH(C_2H_5)]_aHN(CO)NH[CH$
   $(C_2H_5)CH_2O]_bCH_2CH(CH_3)NH_2$
$H_2N(C_2H_5)CHCH_2[OCH_2CH(CH_3)]_aHN(CO)NH[CH$
   $(CH_3)CH_2O]_bCH_2CH(C_2H_5)NH_2$ wherein a=2–68 and b=2–68.

$HOCH(CH_3)CH_2NHCH(CH_3)CH_2[OCH_2CH(CH_3)]_a$
   $NHCH_2CH(CH_3)OH$ wherein a is 2.6.

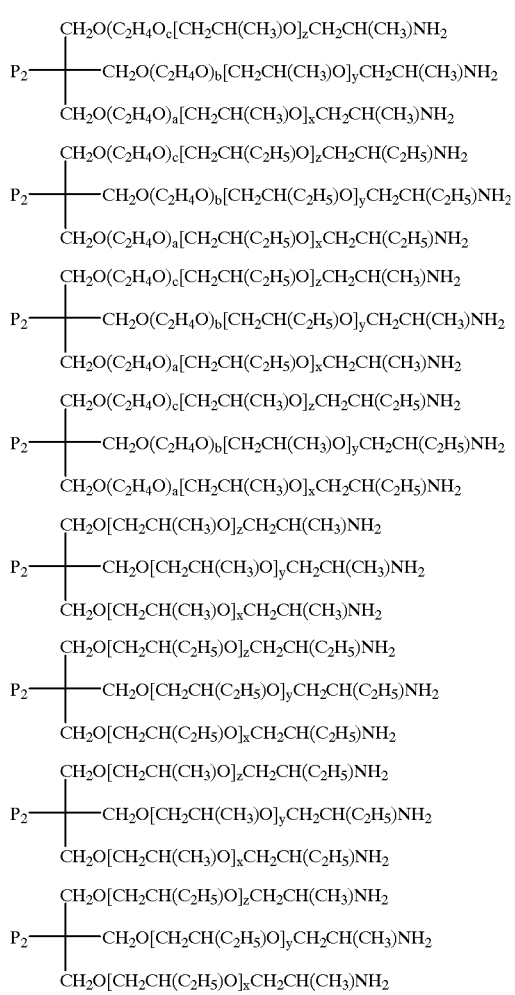

wherein a+b+c=1–80; and x+y+z=5–85; and $P_2$ is recited above.

The preferred aromatic amines finding special utility in the manufacture of the preferred colorants of the present invention are prepared according to Routes 1–6.

Route 1

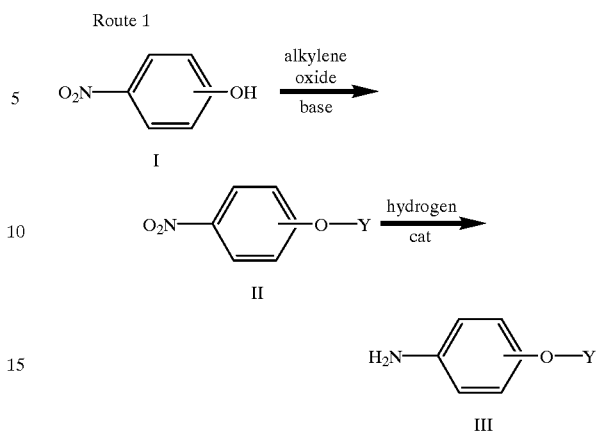

Route 1 involves the hydroxyalkylation of a nitrophenol (I) with an alkylene oxide in the presence of a base catalyst. Suitable alkylene oxides include, for example, ethylene oxide, propylene oxide, butylene oxide, and mixtures of two or more of such compounds.

The hydroxyalkylation reaction may be accomplished by the reaction of alkylene oxide at about 80–150° C. The alkylene oxide is added in the presence of an inert gas such as nitrogen until the desired amount of alkylene oxide has been absorbed. This reaction is carried out with or without solvents. If solvents are desired, toluene, xylenes, nitrobenzene or dioxane may be used.

Useful base catalysts are potassium hydroxide, lithium hydroxide, calcium hydroxide, and barium hydroxide. The amount of basic catalyst can vary but is usually in the range of from about 0.2% to about 2% by weight, based on the weight of the reaction mixture. In addition, certain tertiary organic amines are useful catalysts, such as dimethylaminocyclohexane, triethylamine, and benzyldimethylamine. The poly(oxyalkylated) nitro intermediates (II) are converted into aromatic amines (III) by catalytic hydrogenation. Any suitable reduction catalyst may be used. For example, catalysts such as Raney nickel, nickel oxides, finely divided metals such as iron, cobalt, platinum, ruthenium, osmium, and rhodium nay be used. Furthermore, metal catalysts supported on pumice, asbestos, Kieselguhr, alumina, silica gel or charcoal work equally as well. The amount of catalyst can vary from about 0.025 to 15 percent by weight based on the nitro intermediate (II) used.

Reduction temperatures of about 20° C. to about 90° C., although temperatures of 40° C. to 90° C. are preferred since they may provide faster reaction times and higher yields of the aromatic amines (III). During the reduction of the nitro intermediates(II), pressures ranging from about 500 to about 1800 psi of hydrogen may be used.

The reduction reaction is usually carried out in the presence of a suitable solvent. Solvents include lower alcohols such as methyl alcohol, ethyl alcohol, and isopropyl alcohol; ethers such as dioxane; hydrocarbons such as benzene, toluene, xylenes, cyclohexanes, and petroleum ether; and mixtures of lower alcohols and water such as about equal parts by weight of ethyl alcohol and water. The amount of solvent is an amount of about 30 to about 80 percent by weight of the mixture.

Route 2

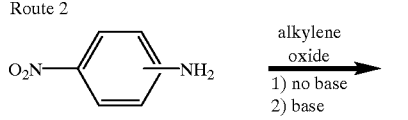

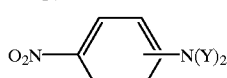

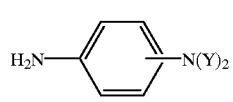

Route 2 involves the hydroxyalkylation of a nitroaniline (IV) with an alkylene oxide in a two-step procedure. The first step can be carried out in the presence or absence of a acid catalyst. Suitable alkylene oxides include, for example, ethylene oxide, propylene oxide, butylene oxide, cyclohexane oxide, glycidyl, and mixtures of two or more of such compounds.

In the first step, hydroxyalkylation may be accomplished by the reaction of the alkylene oxide at about 80–150° C. The alkylene oxide is added in the presence of an inert gas such as nitrogen until two or more equivalents of the desired amount of alkylene oxide have been absorbed. This reaction is carried out with or without solvents. If solvents are desired, toluene, xylenes, nitrobenzene, dioxane are just a few solvents that may be used. Alternatively, an acid catalyst can be employed to effect the hydroxyalkylation. For example, formic acid and acetic acid are typical of the inert acids that may be used. Generally, acid-catalyzed hydroxyalkylation is performed at a lower temperature to avoid the formation of by-products.

Temperatures from about 40° C. to about 120° C. can be employed depending on the basicity of the nitroaniline (IV) to be hydroxyalkylated. The amount of acid may vary widely. Generally from about 0.5 to 10 percent by weight of the mixture may be employed.

In the second step, the nitropolyoxyalkylene intermediate (V) is prepared by the use of base catalysts such as potassium hydroxide, lithium hydroxide, calcium hydroxide, and barium hydroxide. The amount of basic catalyst can vary but is usually in the range of from about 0.2% to about 2% by weight. The reaction temperature can vary but may generally be in the range from 100° C. to about 150° C.

The corresponding aromatic amines (VI) are then prepared by conversion of the poly(oxyalkylene) nitro intermediates (V) by catalyst reduction as described in Route 1 above.

Route 3

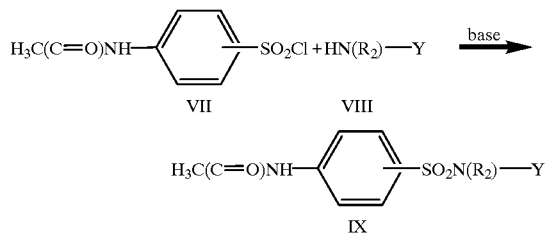

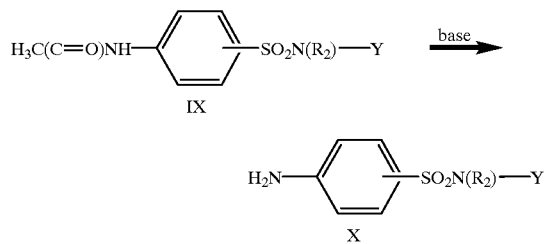

Route 4

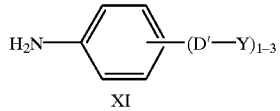

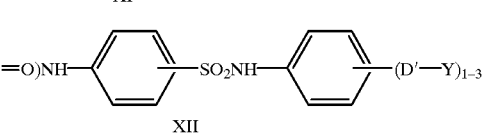

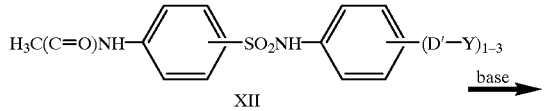

Route 3 involves the condensation of an acetamidobenzenesulfonyl chloride intermediate (VII) with at least a stoichiometric quantity of a aliphatic poly(oxyalkylene) amine (VIII) and an inorganic base at a temperature of from about 0° C. to about 100° C. to form an acetamidopoly (oxyalkylene) intermediate (IX).

Commercially available and amines from which the present preferred aromatic amines are prepared are the JEFFAMINE series described in Texaco Chemical Company, New Product Development brochures as the M, D, ED, DU, BUD, T, MNPA: and EDR series: the disclosures of which are incorporated herein by reference and copies of which are transmitted herewith.

Further heating at 80° C. to 100° C. hydrolyzes the corresponding acetamidopoly(oxyalkylene) intermediate (IX) into the aromatic poly(oxyalkylene) amine (X).

Similarly, Route 4 involves the condensation of an acetamidobenzenesulfonyl chloride intermediate (VII) with at least a stoichiometric quantity of a aromatic poly (oxyalkylene) amine (XI) and a inorganic base at a temperature of from about 0° C. to about 100° C. to form an acetamidopoly(oxyalkylene) intermediate (XII). Further heating at 80° C. to 100° C. hydrolyzes the corresponding acetamidopoly(oxyalkylene) intermediate (XII) into the aromatic poly(oxyalkylene) amine (XIII).

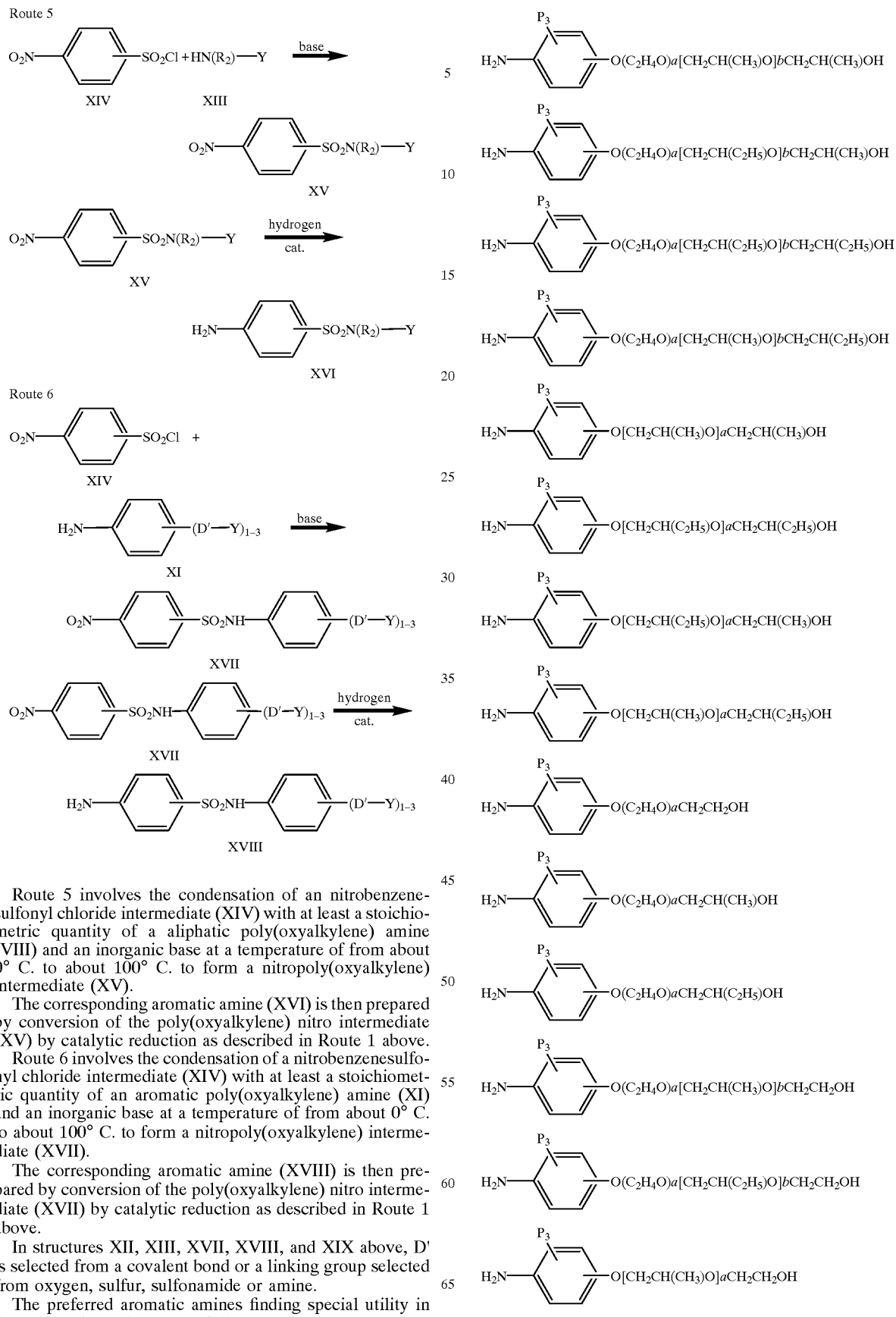

Route 5 involves the condensation of an nitrobenzenesulfonyl chloride intermediate (XIV) with at least a stoichiometric quantity of a aliphatic poly(oxyalkylene) amine (VIII) and an inorganic base at a temperature of from about 0° C. to about 100° C. to form a nitropoly(oxyalkylene) intermediate (XV).

The corresponding aromatic amine (XVI) is then prepared by conversion of the poly(oxyalkylene) nitro intermediate (XV) by catalytic reduction as described in Route 1 above.

Route 6 involves the condensation of a nitrobenzenesulfonyl chloride intermediate (XIV) with at least a stoichiometric quantity of an aromatic poly(oxyalkylene) amine (XI) and an inorganic base at a temperature of from about 0° C. to about 100° C. to form a nitropoly(oxyalkylene) intermediate (XVII).

The corresponding aromatic amine (XVIII) is then prepared by conversion of the poly(oxyalkylene) nitro intermediate (XVII) by catalytic reduction as described in Route 1 above.

In structures XII, XIII, XVII, XVIII, and XIX above, D' is selected from a covalent bond or a linking group selected from oxygen, sulfur, sulfonamide or amine.

The preferred aromatic amines finding special utility in the present invention are as follows:

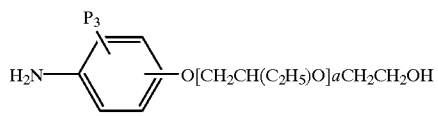
wherein a=1–100; b=1–100; and $P_3$ is selected from $CH_3$, $C_2H_5$, n—$C_3H_7$, n—$C_3H_7$, n—$C_4H_9$, $OCH_3$, or $OC_2H_5$.
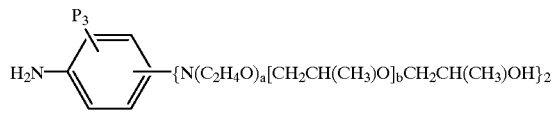
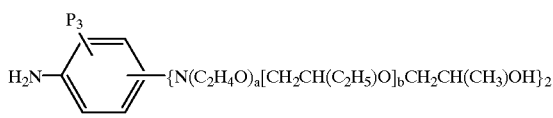
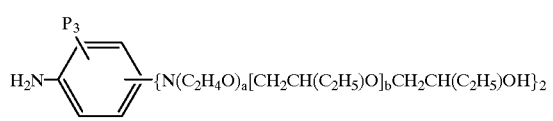
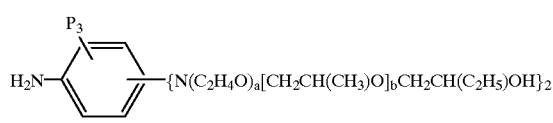
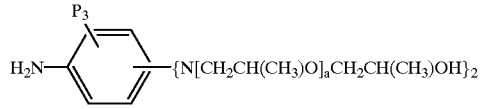
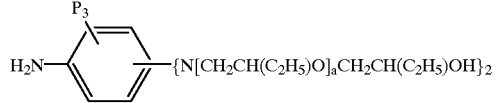
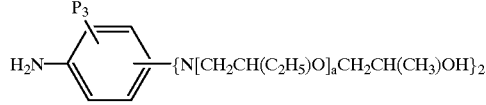
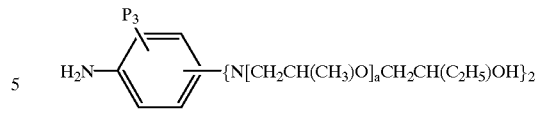
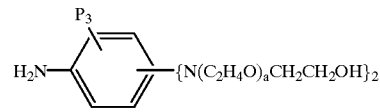
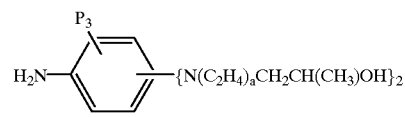
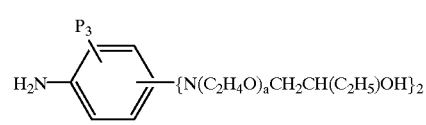
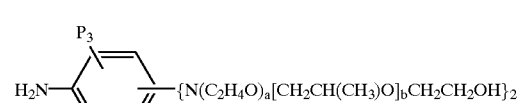
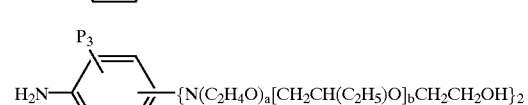
wherein a=1–100; b=1–100; and $R_3$ is selected from $CH_3$, $C_2H_5$, n—$C_3H_7$, n—$C_3H_7$, n—$C_4H_9$, $OCH_3$, or $OC_2H_5$.
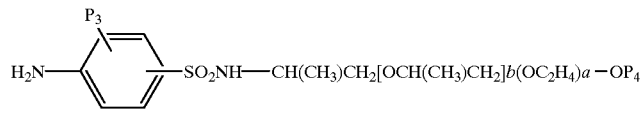
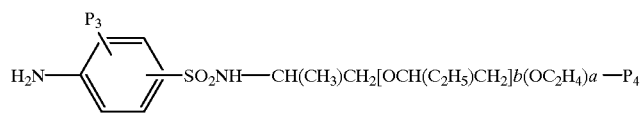
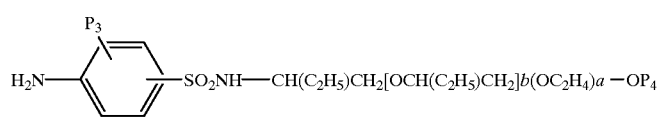
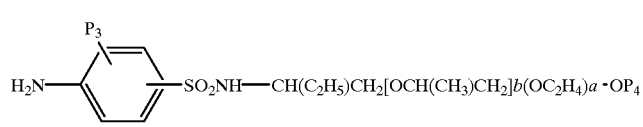

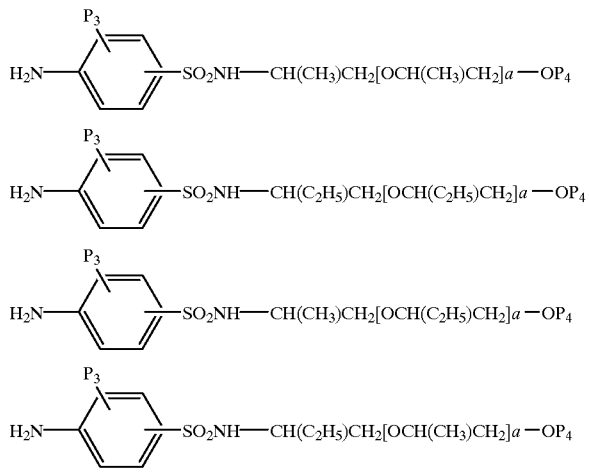
wherein a=1–19; b=2–31; and $P_4$ is selected from $CH_3$, $C_2H_5$, n—$C_3H_7$, n—$C_3H_7$, n—$C_4H_9$, n—$C_5H_{11}$, or n—$C_6H_{11}$ and $P_3$ is recited above.
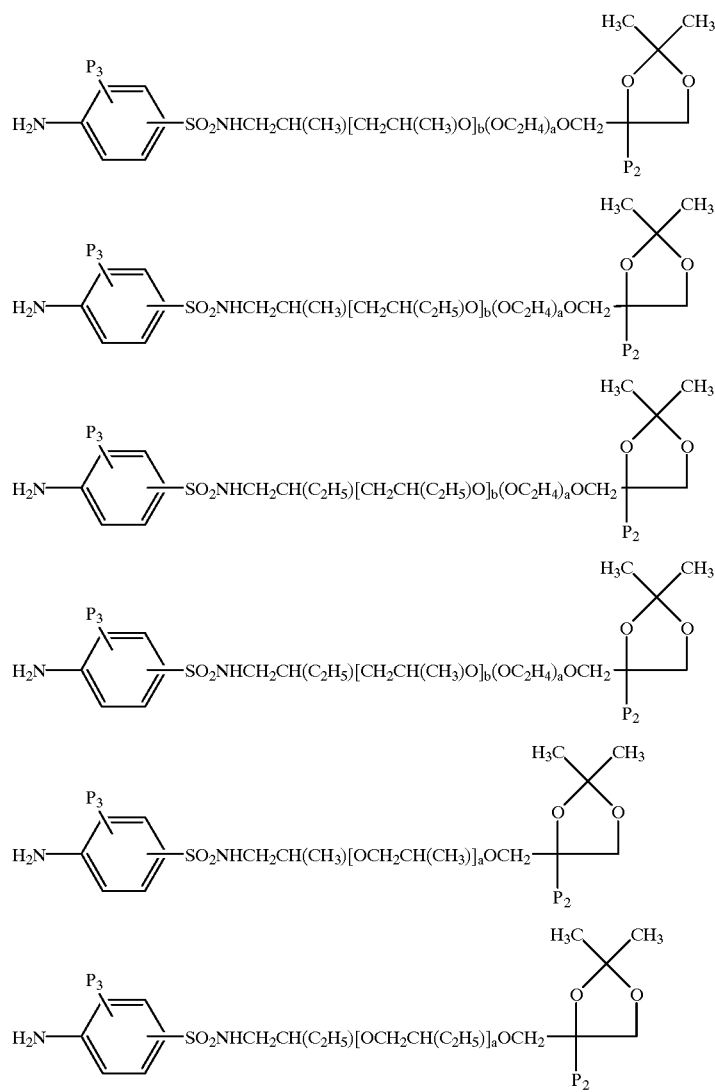

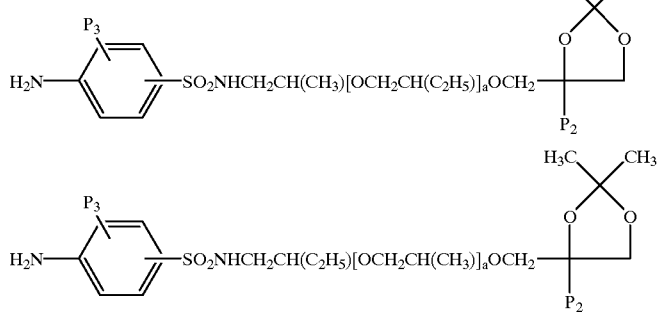
wherein a=1–19; b=2–31; and $P_2$ is selected from hydrogen $CH_3$, or $C_2H_5$, and $P_3$ is recited above.
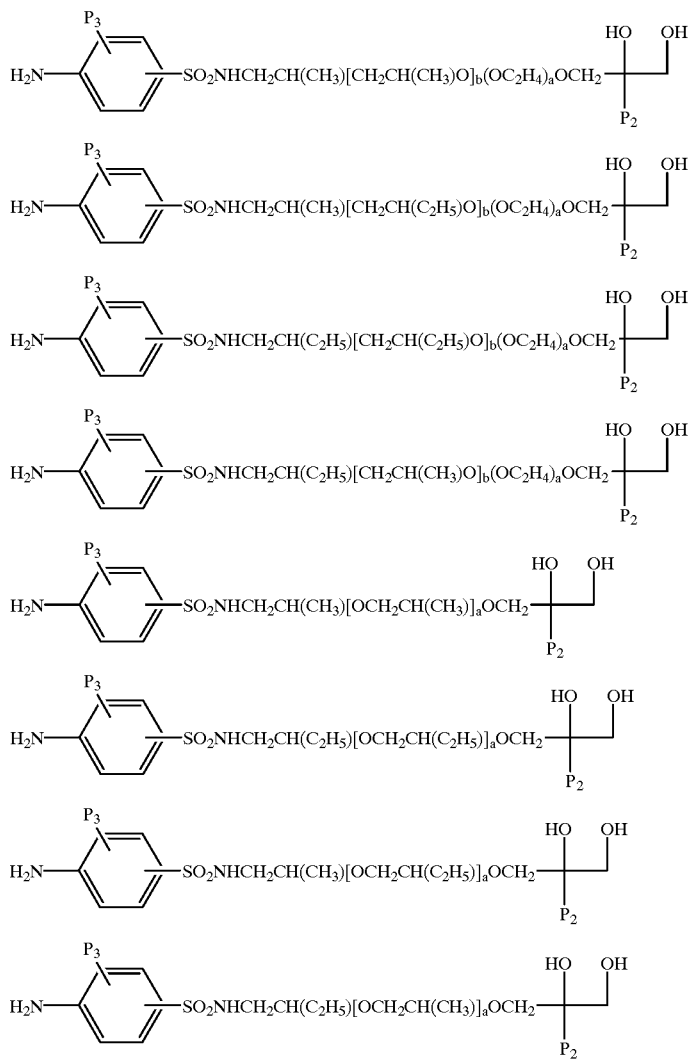

wherein a=1–19; b=2–31; and $P_2$ is recited above.
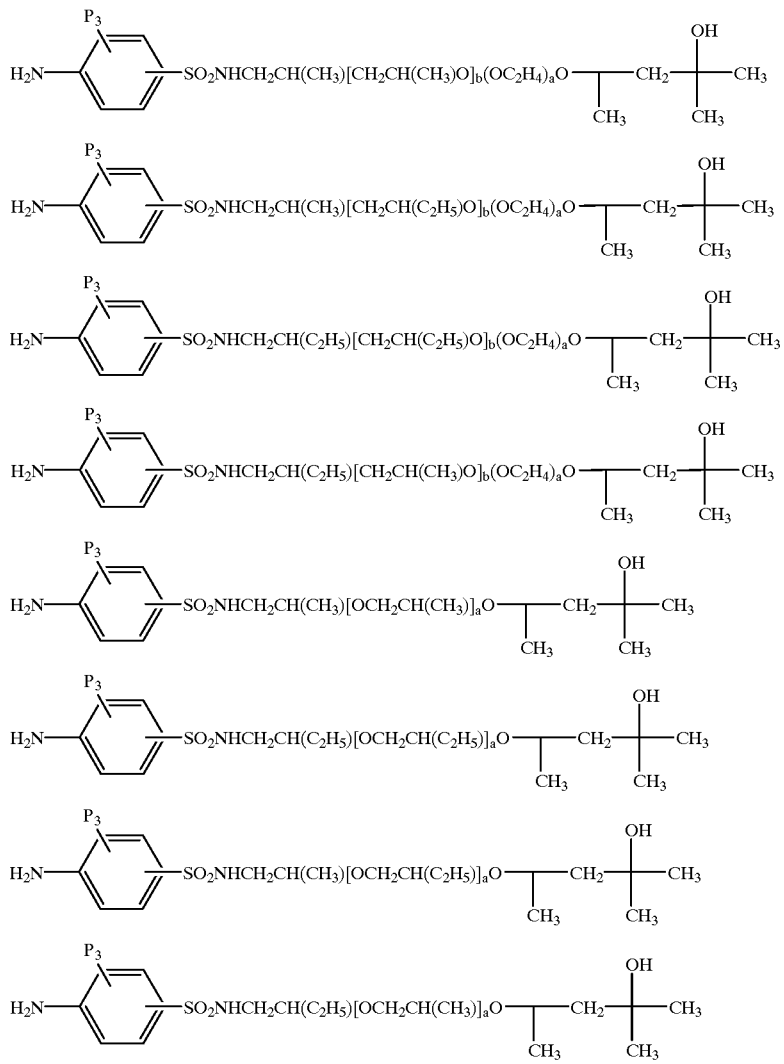
wherein a=1–19; and b=2–31.
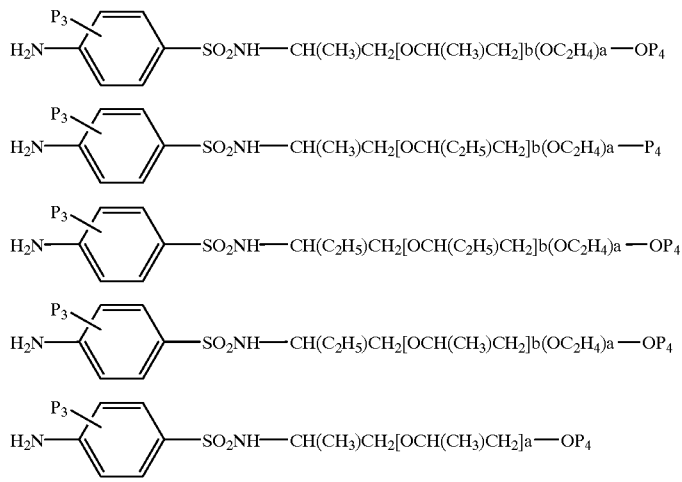

-continued
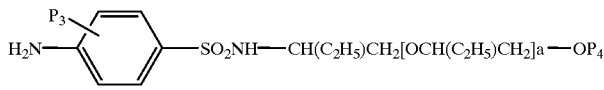
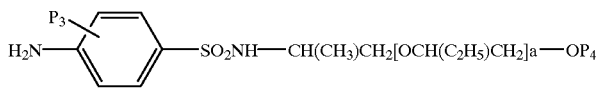
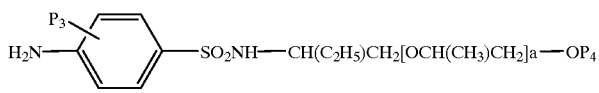
wherein a=4–132; and a+c=2–5.
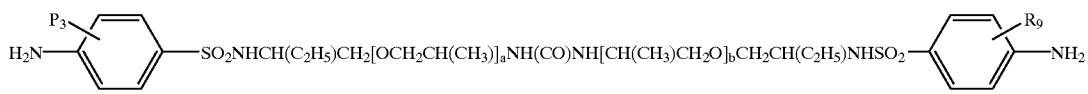
wherein a=1–19; and b=2–31.
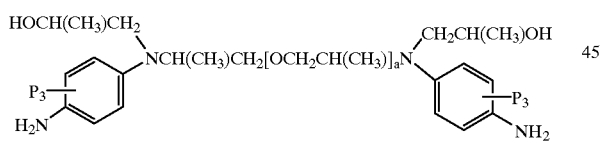
wherein a 2.6.

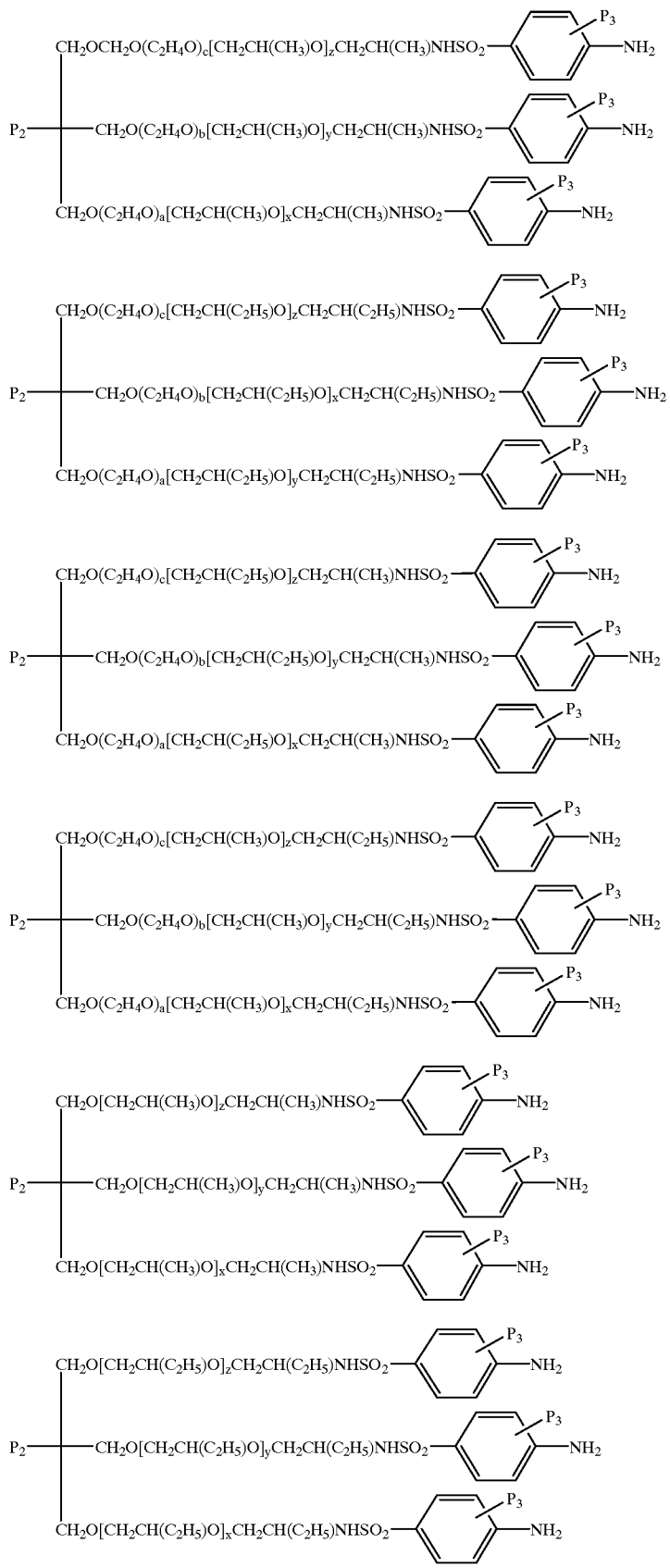

-continued

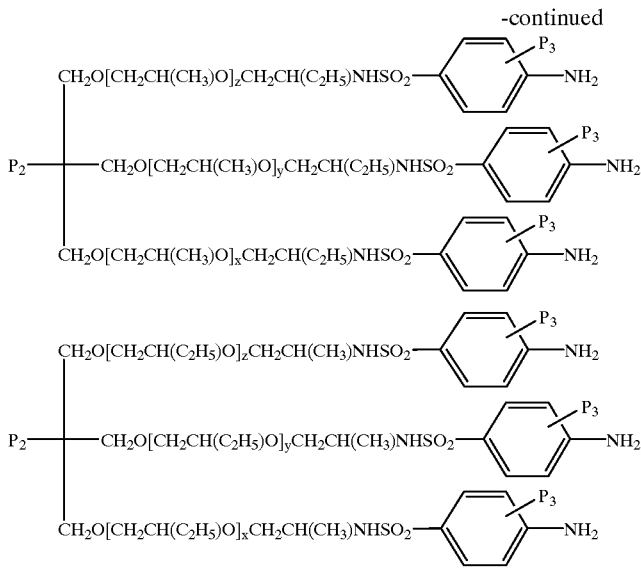

wherein a+b+c=1–80 and x+y+z=5–81; and $P_2$ is recited above.

Thermoplastic resins which may be used according to the present invention include a wide range of resins and synthetic resin compositions which are known in the art as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" used herein is also used in its conventional sense to means a resin having the property of becoming permanently rigid when heated or cured.

Examples of thermoplastic resin systems which may be employed include a wide range of polyolefin polymers, e.g., polyethylene, linear low density polyethylene, polypropylene, polybutylene, and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as polymethyl methacrylate, styrene acrylonitrile, polystyrene, polycarbonate and acrylonitrile butadiene styrene (therein ABS), polyamides such as nylon 6 and nylon 66 and polyesters such as polyethylene terephthalate, especially glycol modified polyethylene terephthalate and polybutylene terephthalate.

As mentioned above, the colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.001 percent to about 10 percent, preferably from about 0.001 percent to about 3 percent, and most preferably from about 0.1 to about 1.0 percent by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Because the colorants if used properly ordinarily do not detract from the clarity of the resin, it has been found that additives which improve the clarity of such resins may be particularly desirable for use in combination with colorants as described herein to provide resin products that are both colored and which also have excellent clarity. One particular class of additives which have been found to be useful in this regard are the benzylidene sorbitols including substituted benzylidene sorbitols such as those described in U.S. Pat. No. 4,016,118 to Ramada, et al. (E.C. Chemical); U.S. Pat. No. 4,371,645 to Mahaffey (Milliken Research Corporation); and Japanese Pat. No. SHO [1977] 53-117044 to Kobsyashi, et al. (New Japan Chemical); all of these patents being hereby incorporated herein by reference. The particular shade of the colorant will depend primarily upon the particular chromophore group selected. A large variety of colors and shades may be obtained by blending two or more colorants. Blending the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the invention, the colorant may be incorporated into the thermoplastic resin using conventional techniques such as those employed to incorporate other additives in such resins. For instance, the colorant may he incorporated into the resin by simply adding it to the resin while the resin is in a plasticized or molten state, typically prior to formation of the polymer into its final shape, e.g., by molding, extrusion, blow-molding and the like. For instance, when the thermoplastic resin to be colored is a polyolefin resin the process may be carried out by adding a colorant comprised of a poly(oxyalkylene) substituted chromophore group directly to the molten polymer, by tumbling it onto a pre-extruded pelletized resin, or by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first he prepared. Such concentrate may contain an appropriately high percentage of colorant. The concentrates may be in the form of liquids, solids, e.g., powders, pellets, etc., as may be desired. These concentrates may then incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in solvent-free form rather than in the form of solutions or dispersions in a suitable solvent or dispersing medium. Obviously, liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of or solvent or dispersing agent which is compatible with the resin, thus providing certain processing advantages.

According to the process of the invention, the liquid colorant may be incorporated into the thermosetting resins by simply adding it to the reaction mixture or to one of the components of the reaction mixture before or during the poly-addition reaction. For instance, when the thermosetting resin to be colored is a polyurethane resin the process may be carried out by adding the coloring agent in the form of a liquid to the polyol or even in some instances to the polyisocyanate component of the reaction mixture either before or during polyurethane formation. The subsequent reaction may be carried out in the usual manner, i.e., in the same way as for polyurethane resins which are not colored. Details about this procedure may be found in the relevant literature.

The present coloring agents of one embodiment of the present invention are polymeric, liquid, reactive coloring agents. Thus, they may be added to the reaction mixture or to one of the components thereof in solvent-free form rather than in the form of solutions or dispersions in suitable solvent or dispersing medium. Obviously liquids have significant processing advantages over solids, and moreover liquids of the present invention may, if desired, be added directly to the reaction mixture and therefore contain no extraneous nonreactive solvent or dispersing agent. This process may, therefore, provide unusual and advantageous properties in the final thermoset resin product. Alternatively, however, the coloring agent may be premixed with minor amounts of one or more of the precursors of the polymeric product, thus providing certain processing advantages.

The thermosetting resins to which the process of the present invention may be applied may be made by the reaction of a nucleophile with an electrophile. Examples of such resins include alkyds, allylics, the amines, e.g., melamine and urea, epoxies, phenolics, polyesters, silicones and urethanes. The thermosetting resin colored according to the present invention can be used in a variety of different end uses. e.g., as moldings, sealants, elastomers, films, fibers, lacquers, coating and foamed materials. It has been found in particular that the present colorants may quite advantageously be employed for the production of foams, such as polyurethane foams which may be soft, semi-rigid or rigid foams, or the so-called polyurethane integral skin and microcellular foams. Such foams are useful for producing shaped products by injection molding, extrusion or calendaring and may be obtained by adding the liquid coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The colorant may also be admixed with chain extending diols, e.g., ethylene glycol, diethylene glycol and butane diol. In general, it is desirable not to use more than about 20 percent by weight of colorant based on the weight of polyol. In most cases very strong colorations are produced with a small proportion of the colorant, for example, from about 0.1 to about 2 percent, preferably 0.5 to 1 percent by weight colorant based on the weight of polyol.

Because the present colorants are, in themselves, polymeric compounds, they may he soluble, for instance, in most polyols which would be used in polyurethane manufacture, in most epoxy formulations, in polyester formulations and themselves in admixtures. This property may be particularly valuable in that this solubility may permit rapid mixing and homogeneous distribution throughout the resin, thus eliminating shading differences and streaks when properly mixed, the colorant may have no tendency to settle as would be the base with pigment dispersions, and it is possible to prepare a blend of two or more colorants which provides a wide range of color availability.

The present liquid reactive coloring agents may also be of considerable value in reaction injection molding (RIM) applications. The RIM process is a method of producing molded polyurethanes and other polymers wherein the two reactive streams are mixed while being poured into a mold. Upon reaction, the polymer is "blown" by chemicals to produce a foam structure. This process may be hindered by the presence of solid particles, such as conventional pigments. The present invention may not cause this hinderance because there are no particles in the system and the colorant becomes part of the polymer through reaction with one of the components.

The following examples and tables further illustrate specific colorants of the present invention and the parts and percentages, unless otherwise stated being by weight. The abbreviation EO, PO, and BO refer to —$CH_2CH_2O$—, —$CH(CH_3)CH_2O$—, and —$CH(C_2H_5)CH_2O$—, respectively. Wherever A is used in the tables, it designates the anthraquinone or condensed anthraquinone spectfied in that example.

EXAMPLE #1

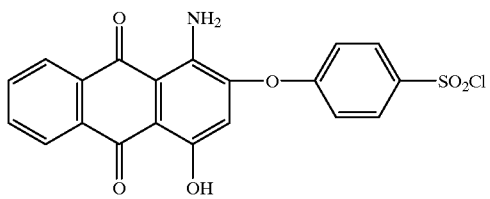

One hundred grams (0.32 mole) of 1-amino-2-phenoxy-4-hydroxyanthraquinone are dissolved at less than 25° C. in 423 grams of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The red suspension of 1-amino-2-(4'-chlorosulfonyl)phenoxy-4-hydroxyanthraquinone is filtered and washed with ice water several times.

EXAMPLE #1A

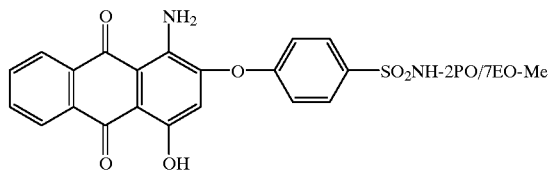

A mixture is prepared by adding 91.0 grams (0.19 mole) of a primary amine with an amine equivalent weight of 2.10 meq/g to 44.5 grams sodium carbonate in 400 ml of THF and 200 ml of water. The mixture is cooled to 10–15° C. and 0.18 mole of an aqueous wet cake of freshly prepared 1-amino-2-(4'-chloro-sulfonyl)phenoxy-4-hydroxyanthraquinone from EXAMPLE #1 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a red product with maximum absorbance at 518 nm.

EXAMPLE #1B

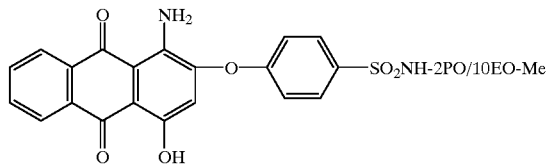

A mixture is prepared by adding 83.3 grams (0.14 mole) of a primary amino with an amino equivalent weight of 1.68 meq/g) to 33 grams sodium carbonate in 400 ml of THY and 200 ml of water. The mixture is cooled to 10–15° C. and 0.13 mole of an aqueous wet cake of freshly prepared 1-amino-2-(4-chlorosulfonyl)-phenoxy-4'-hydroxyanthraquinone from EXAMPLE #1 is added to the mixture. After the addition is complete, the mixture is warmed to 50° C. for an additional two hours to insure complete reaction. Three hundred milliliters of methylene chloride are added followed by 300 milliliters of water. The methylene chloride solution is separated from the salt water solution, further washed several times with water to neutral pH, and dried over anhydrous magnesium sulfate. The dried solution is filtered and stripped under reduced pressure at 90° C. to give a red product with maximum absorbance at 518 nm.

EXAMPLE #1C

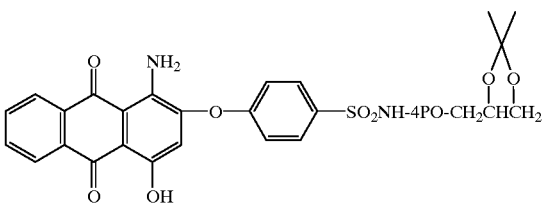

A mixture is prepared by adding 103.7 grams (0.28 mole) of a primary amine with an amine equivalent weight of 2.70 meq/g) to 64.7 grams sodium carbonate in 400 ml of THF and 200 ml of water. The mixture is cooled to 10–15° C. and 0.26 mole of an aqueous wet cake of freshly prepared 1-amino-2-(4'-chlorosulfonyl)phenoxy-4-hydroxyanthraquinone from EXAMPLE #1 is added to the mixture. After the addition is complete, the mixture is warmed to 50° C. for an additional two hours to insure complete reaction. Three hundred milliliters of methylene chloride are added followed by 300 milliliters of water. The methylene chloride solution is separated from the salt water solution, further washed several times with water to neutral pH, and dried over anhydrous magnesium sulfate. The dried solution is filtered and stripped under reduced pressure at 90° C. to give a red product with maximum absorbance at 518 nm.

EXAMPLE #1D

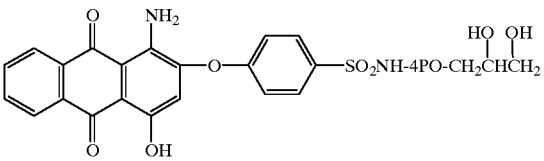

Ninety-two grams (0.12 mole) of the acetal prepared in EXAMPLE #1C are added along with 200 ml of water to a three necked 250 ml flask equipped with overhead stirrer, heating mantle, and Dean Stark trap. The mixture is heated to 80° C. and 10 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a red product with maximum absorbance at 518 nm and containing a hydroxyl band in the IR spectrum.

EXAMPLE #1E

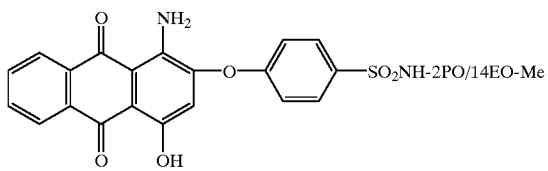

A mixture is prepared by adding 80.7 grams (0.11 mole) of a primary amine with an amine equivalent weight of 1.35 meq/g) to 25.7 grams sodium carbonate in 500 ml of water and 200 ml of THY. The mixture is cooled to 10–15° C. and 0.10 mole of an aqueous wet cake of freshly prepared 1-amino-2-(4'-chlorosulfonyl)phenoxy-4-hydroxyanthraquinone from EXAMPLE #1 is added to the mixture. After the addition is complete, the mixture is warmed to 50° C. for an additional two hours to insure complete reaction. Three hundred milliliters of methylene chloride are added followed by 300 milliliters of water. The methylene chloride solution is separated from the salt water solution, further washed several times with water to neutral pH, and dried over anhydrous magnesium sulfate. The dried solution is filtered and stripped under reduced pressure at 90° C. to give a red product with maximum absorbance at 518 nm.

EXAMPLE #2

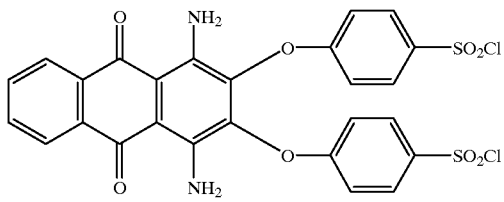

One hundred thirty-five grams (0.32 mole) of 1,4-diamino-2,3-diphenoxyanthraquinone are dissolved at less than 25° C. in 890 grams of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The violet suspension of 1,4-diamino-2,3-di-(4'-chlorosulfonylphenoxy) anthraquinone is filtered and washed with ice water several times.

EXAMPLE #2A

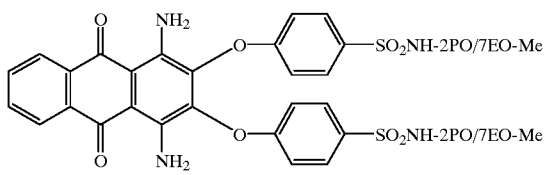

A mixture is prepared by adding 91.0 grams (0.19 mole) of a primary amine with an amine equivalent weight of 2.10 meq/g) to 44.5 grams sodium carbonate in 400 ml of THF and 200 ml of water. The mixture is cooled to 10–15° C. and 0.095 mole of an aqueous wet cake of freshly prepared 1,4-diamino-2,3-di-(4'-chlorosulfonylphenoxy) anthraquinone from EXAMPLE #2 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a violet liquid with maximum absorbance at 547 nm.

EXAMPLE #3

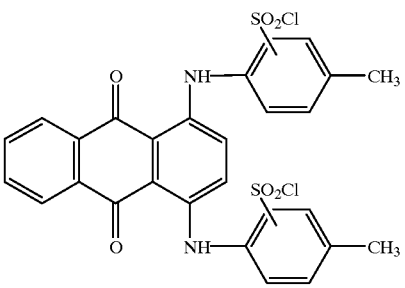

One hundred thirty-five grams (0.32 mole) of 1,4-di-p-toluidinoanthraquinone are dissolved at less than 25° C. in 890 grams of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The blue suspension of 1,4-di(chorosulfonyl-p-toluidino)anthraquinone is filtered and washed with ice water several times.

EXAMPLE #3A

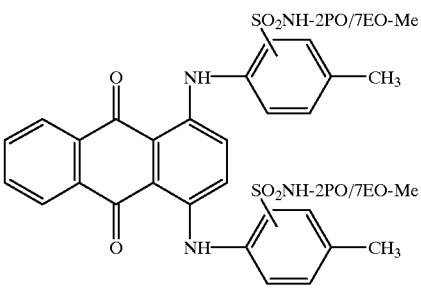

A mixture is prepared by adding 91.0 grams (0.19 mole) of a primary amine with an amine equivalent weight of 2.10 meq/g) to 44.5 grams sodium carbonate in 400 ml of THF and 200 ml of water. The mixture is cooled to 10–15° C. and 0.095 mole of an aqueous wet cake of freshly prepared 1,4-di(chlorosulfonyl-p-toluidino)-anthraquinone from EXAMPLE #3 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a bluish-green liquid with maximum absorbance at 660 nm.

EXAMPLE #4

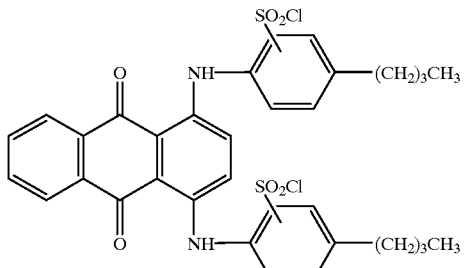

Seventy-one grams (0.1 mole) of Acid Green 27 (C.I. 61570) are dissolved at less than 25° C. in 300 milliliters of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The greenish-blue suspension of 1,4-bis[chlorosulfonyl-4'-n-butylanilino]-anthraquinone is filtered and washed with ice water several times.

EXAMPLE #4A

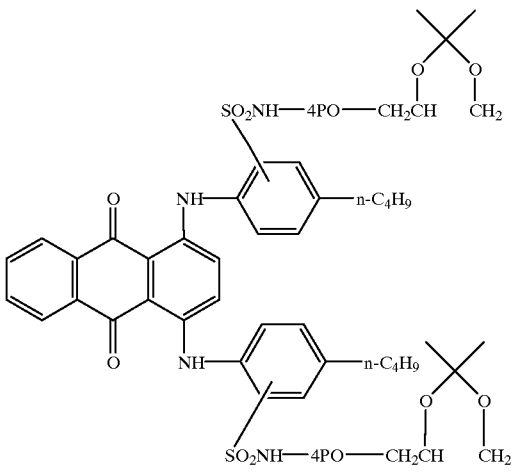

A mixture is prepared by adding 70.4 grams (0.19 mole) of a primary amine with an amine equivalent weight of 2.70 meq/g) to 45.5 grams sodium carbonate in 400 ml of THF and 200 ml of water. The mixture is cooled to 10–15° C. and 0.095 mole of an aqueous wet cake of freshly prepared 1,4-bis[chlorosulfonyl-4'-n-butylanilino]anthraquinone from EXAMPLE #4 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a greenish-blue product.

EXAMPLE #4B

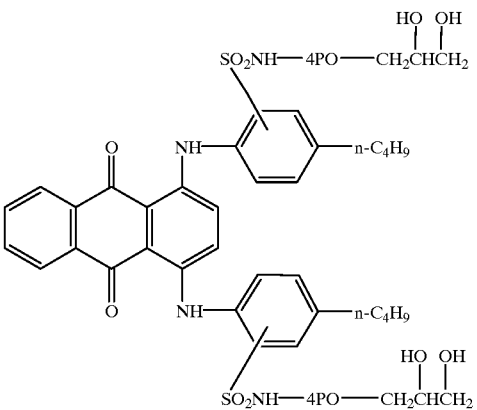

Sixty-seven grams (0.05 mole) of the acetal prepared in EXAMPLE #4A are added along with 200 ml of water to a three necked 500 ml flask equipped with overhead stirrer, heating mantle, and Dean-Stark trap. The mixture is heated to 80° C. and 10 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a greenish-blue product containing a hydroxyl band in the IR spectrum.

EXAMPLE #5

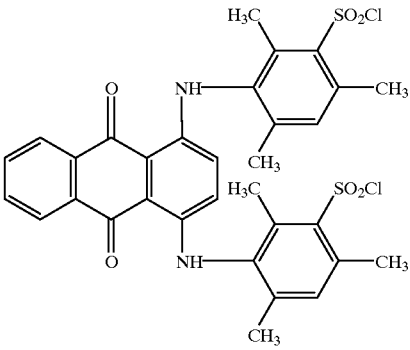

Sixty-eight grams (0.1 mole) of Acid Blue 80 (C.I. 61585) are dissolved at less than 25° C. in 300 milliliters of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The blue suspension of 1,4-bis[3'-chlorosulfonyl-2',4',6'-trimethylanilino]-anthraquinone is filtered and washed with ice water several times.

EXAMPLE #5A

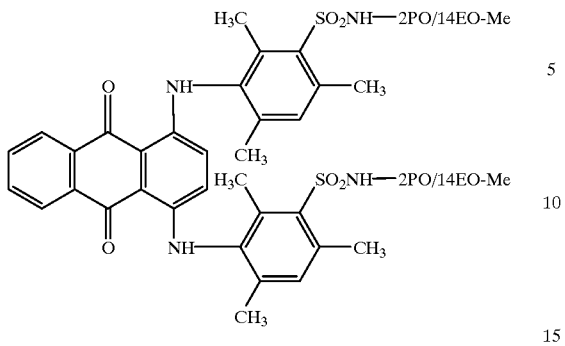

A mixture is prepared by adding 140.7 grams (0.19 mole) of a primary amine with an amine equivalent weight of 1.35 meq/g) to 44.5 grams sodium carbonate in 400 ml of THF and 200 ml of water. The mixture is cooled to 10–15° C. and 0.095 mole of an aqueous wet cake of freshly prepared 1,4-bis[3'-chlorosulfonyl-2',4',6'-trimethylanilino] anthraquinone from EXAMPLE #5 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue product.

EXAMPLE #6

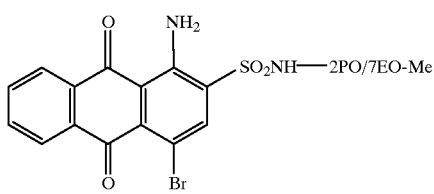

A mixture is prepared by adding 91.0 grams (0.19 mole) of a primary amine with an amine equivalent weight of 2.10 meq/g) to 44.5 grams sodium carbonate in 400 ml of THF and 200 ml of water. The mixture is cooled to 10–15° C. and 0.18 mole of an aqueous wet cake of freshly prepared 1-amino-4-bromoanthraquinone-2-sulfonyl chloride is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a orangish product with maximum absorbance at 482 nm.

EXAMPLE #6A

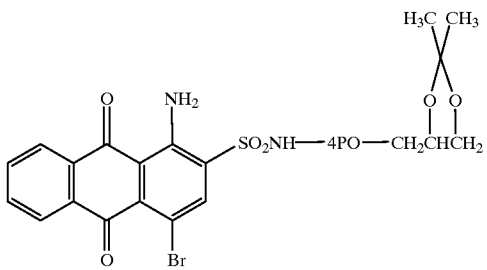

A mixture is prepared by adding 103.7 grams (0.28 mole) of a primary amine with an amine equivalent weight of 2.70 meq/g) to 64.7 grams sodium carbonate in 400 ml of THF and 200 ml of water. The mixture is cooled to 10–15° C. and 0.26 mole of an aqueous wet cake of freshly prepared 1-amino-4-bromoanthraquinone-2-sulfonyl chloride from EXAMPLE #6 is added to the mixture. After the addition is complete, the mixture is warmed to 50° C. for an additional two hours to insure complete reaction. Three hundred milliliters of methylene chloride are added followed by 300 milliliters of water. The methylene chloride solution is separated from the salt water solution, further washed several times with water to neutral pH, and dried over anhydrous magnesium sulfate. The dried solution is filtered and stripped under reduced pressure at 90° C. to give a orange product with maximum absorbance at 482 nm.

EXAMPLE #6B

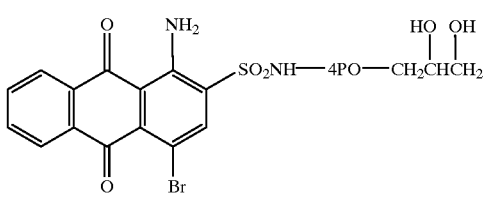

Seventy-six grams (0.12 mole) of the acetal prepared in EXAMPLE #6A is added along with 200 ml of water to a three necked 500 ml flask equipped with overhead stirrer, heating mantle, and Dean-Stark trap. The mixture is heated to 80° C. and 10 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give an orange product with maximum absorbance at 482 nm and containing a hydroxyl band in the IR spectrum.

EXAMPLE #7

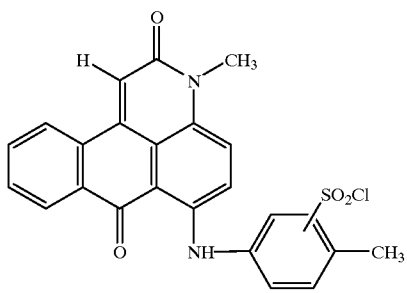

One hundred seventeen grams (0.32 mole) of 3-methyl-6-(p-toluidino)anthrapyridone are dissolved at less than 25° C. in 890 grams of chlorosulfuric acid. The cooling bath is removed and the solution is allowed to warm to room temperature over two hours. The solution is further heated to 60° C. for about two hours after which the heat is removed and the solution is allowed to stir overnight at room temperature. The solution is then poured very gradually into a stirred mixture of water and ice. The red suspension of 3-methyl-6-(chlorsulfonyl-p-toluidino)-anthrapyridone is filtered and washed with ice water several times.

EXAMPLE #8

Thirty-six grams (0.10 mole) of 7-hydroxyphthaloylphenothiazine are dissolved at less than 25° C. in 700 milliliters of chlorosulfuric acid. The cooling bath is removed and the solution is allowed to warm to room temperature over two hours. The solution is further heated to 30–40° C. for about two hours after which the heat is removed and the solution is allowed to stir overnight at room temperature. The solution is then poured very gradually into a stirred mixture of water and ice. The blue suspension of 7-hydroxyphthaloylphenothiazinesulfonyl chloride is filtered and washed with ice water several times.

EXAMPLE #7A

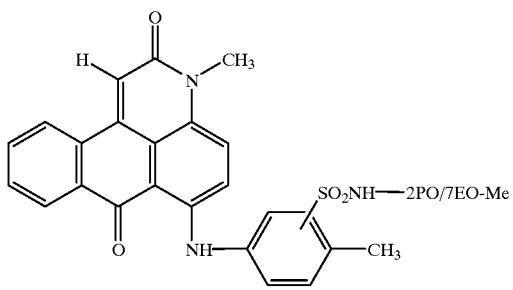

A mixture is prepared by adding 91.0 grams (0.19 mole) of a primary amine with an amine equivalent weight of 2.10 meq/g) to 44.5 grams sodium carbonate in 400 ml of THF and 200 ml of water. The mixture is cooled to 10–15° C. and 0.18 mole of an aqueous wet cake of freshly prepared 3-methyl-6-(chlorosulfonyl-p-toluidino)anthrapyridone from EXAMPLE #7 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a red product with maximum absorbance at 523 nm.

EXAMPLE #8A

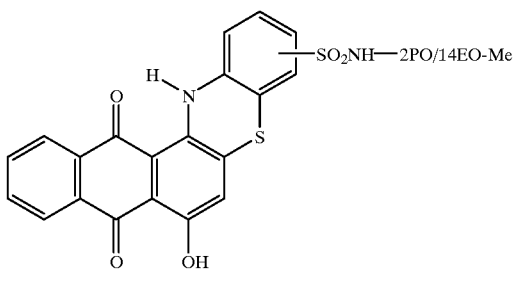

A mixture is prepared by adding 39.2 grams (0.053 mole) of a primary amine with an amine equivalent weight of 1.35 meq/g) to 22.5 grams sodium carbonate in 400 ml of THF and 200 ml of water. The mixture is cooled to 10–15° C. and 0.05 mole of an aqueous wet cake of freshly prepared 7-hydroxyphthaloylphenothiazinesulfonyl chloride from EXAMPLE #8 is added to the mixture. After the addition is complete, the mixture is warmed to 50C for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue product with maximum absorbance at 608 nm.

EXAMPLE #8B

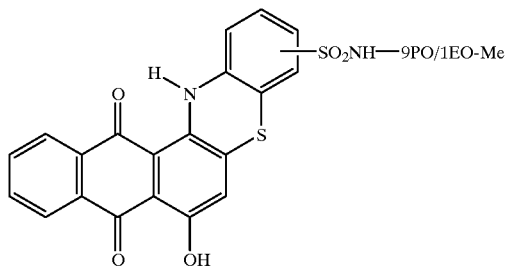

A mixture is prepared by adding 31.9 grams (0.053 mole) of Jeffamine M-600 with a primary amine equivalent weight of 1.66 meq/g) to 22.5 grams sodium carbonate in 400 ml of THF and 200 ml of water. The mixture is cooled to 10–15° C. and 0.05 mole of an aqueous wet cake of freshly prepared 7-hydroxyphthaloylphenothiazinesulfonyl chloride from EXAMPLE #8 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colored product.

EXAMPLE #8C

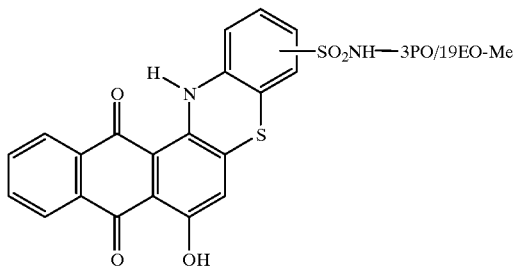

A mixture is prepared by adding 62.3 grams (0.053 mole) of Jeffamine M-1000 with a primary amine equivalent weight of 0.85 meq/g) to 22.5 grams sodium carbonate in 400 ml of THY and 200 ml of water. The mixture is cooled to 10–15° C. and 0.05 mole of an aqueous wet cake of freshly prepared 7-hydroxyphthaloylphenothiazinesulfonyl chloride from EXAMPLE #8 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colored product.

EXAMPLE #9

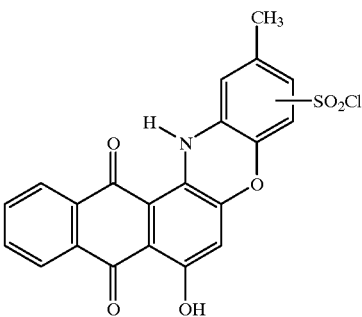

Forty-two grams (0.11 mole) of 3-methyl-7-hydroxyphthaloylphenoxazine are dissolved at less than 25° C. in 300 milliliters of chlorosulfuric acid. The cooling bath is removed and the solution is allowed to warm to room temperature over two hours. The solution is further heated to 30–40° C. for about two hours after which the heat is removed and the solution is allowed to stir overnight at room temperature. The solution is then poured very gradually into a stirred mixture of water and ice. The blue suspension of 3-methy-7-hydroxyphthaloylphenoxazinesulfonyl chloride is filtered and washed with ice water several times.

EXAMPLE #9A

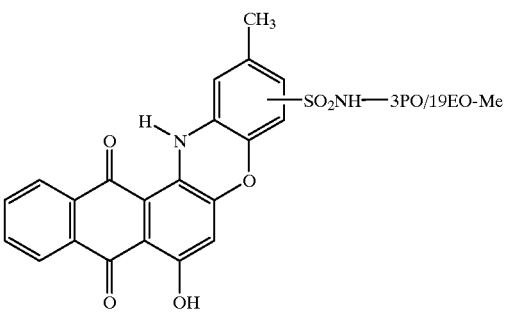

A mixture is prepared by adding 62.3 grams (0.053 mole) of a primary amine with an amine equivalent weight of 0.85 meq/g to 22.5 grams sodium carbonate in 400 ml of THF and 200 ml of water. The mixture is cooled to 10–15° C. and 0.05 mole of an aqueous wet cake of freshly prepared 3-methy-7-hydroxyphthaloylphenoxazinesulfonyl chloride from EXAMPLE #9 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a reddish-blue product with maximum absorbance at 584 nm.

EXAMPLE #9B

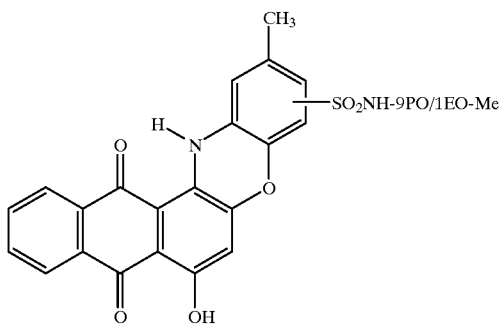

A mixture is prepared by adding 31.9 grams (0.053 mole) of Jeffamine M-600 with a primary amine equivalent weight of 1.66 meq/g) to 22.5 grams sodium carbonate in 400 ml of THF and 200 ml of water. The mixture is cooled to 10–15° C. and 0.05 mole of an aqueous wet cake of freshly prepared from 3-methy-7-hydroxyphthaloylphenoxazinesulfonyl chloride from EXAMPLE #9 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a reddish-blue colored product.

EXAMPLE #10

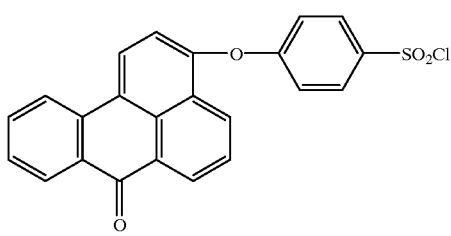

Thirty-four grams (0.1 mole) of 3-phenoxybenzanthrone are dissolved at less than 25° C. in 200 milliliters of chlorosulfuric acid. The cooling bath is removed and the solution is allowed to warm to room temperature over two hours. The solution is further heated to 30–40° C. for about two hours after which the heat is removed and the solution is allowed to stir overnight at room temperature. The solution is then poured very gradually into a stirred mixture of water and ice. The yellow suspension of 3-(4'-chlorosulfonyl)phenoxybenzanthrone is filtered and washed with ice water several times.

EXAMPLE #10A

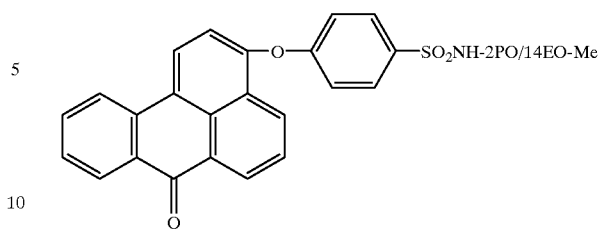

A mixture is prepared by adding 81.5 grams (0.11 mole) of a primary amine with an amine equivalent weight of 1.35 meq/g to 44.5 grams sodium carbonate in 400 ml of THF and 200 ml of water. The mixture is cooled to 10–15° C. and 0.10 mole of an aqueous wet cake of freshly prepared from 3-(4'-chlorosulfonyl)-phenoxybenzanthrone from EXAMPLE #10 is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a yellow product.

EXAMPLE #11

This example illustrates the use of polymeric anthraquinone and condensed anthraquinone colorants in polyolefin systems. The following formulations are preblended using a paddle type mixer and the colorant of Example 3A:

| *INGREDIENT | Formulation 1 |
|---|---|
| 4MF Polypropylene resin (Exxon 9142G) | 99.47% |
| Irganox 1010 (Ciba-Geigy) | 800 ppm |
| Millad 3940 | 2500 ppm |
| Calcium stearate | 1000 ppm |
| Polymeric colorant(Example #3A) | 1000 ppm |

| *INGREDIENT | Formulation 2 |
|---|---|
| 4MF Polypropylene resin (Exxon 9142G) | 99.62% |
| Irganox 1010 (Ciba-Geigy) | 800 ppm |
| TiO$_2$ | 1000 ppm |
| Calcium stearate | 1000 ppm |
| Polymeric colorant(Example #3A) | 1000 ppm |

*Calcium stearate functions as a stabilizer; Irganox 1010 is a registered trademark of Ciba-Geigy Corporation for a hindered phenol stabilizer; Millard 3940 is a clarifier for polyolefins; TiO$_2$ is a white pigment which serves as an opacifier; 4MF Polypropylene resin (Exxon 9142G) is a random copolymer of propylene and ethylene.

After mixing, the formulations shown above are melt compounded on a Brabender Twin Screw Mixer with a stock temperature of 245–250° C. The compounded samples are then injection molded on a small toggle clamp machine into two-step plaques with thickness of 50 and 85 mils.

Formulation #1 had good clarity and is a clear blue shade. Formulation #2 is opaque and has a blue shade. Both formulations process well in addition to having properties such as excellent heat stability, non-nucleation, non-migration and ease of resin clean up.

EXAMPLE #12

This example illustrates the use of polymeric anthraquinone and condensed anthraquinone colorants in polyurethane. A polyurethane foam is prepared using the colorant of Example #4B in the formulation shown below:

| | |
|---|---|
| Niax 16-56 Polyol(Union Carbide Corp.) | 100 g |
| Water | 4.8 ml |
| Dabco 33 LV(Air Products) | 0.31 ml |
| T-9 Catalyst(MIT Chemical Co.) | 0.2 ml |
| L-520 Silicone(Union Carbide Corp.) | 1.5 ml |
| Methylene Chloride | 5.4 ml |
| Toluene Diisocyanate | 55 ml |
| Colorant(Example #4B) | 1 g |

This foam is cured for one hour at 160° F. to give an even, bright blue shade. The polymeric colorant is not extractable with methanol, indicating that the colorant had copolymerized into the polyurethane structure.

TABLE 1

(Anthraquinones)

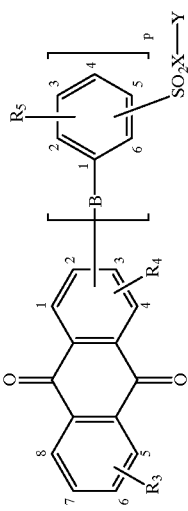

| Example | R$_3$ | R$_4$ | R$_5$ | B | X | p | Y |
|---|---|---|---|---|---|---|---|
| 1 | H | 1-NH$_2$ | 4-CH$_3$ | 4-NH— | —NH— | 1 | 9PO/1EO-Me |
| 2 | H | 1-NH$_2$,2-CH$_3$ | 4-OCH$_3$ | 4-NH— | —NH— | 1 | 2PO/14EO-Me |
| 3 | H | 1-NH$_2$,2-Br | 2-OC$_2$H$_5$ | 4-NH— | —NH— | 1 | 3PO/19EO-Me |
| 4 | H | 1-NH$_2$,2-OCH$_3$ | 3-OCH$_3$ | 4-NH— | —N(CH$_3$)— | 1 | 2PO/7EO-Me |
| 5 | H | 1-NH$_2$,2-S—nC$_4$H$_9$ | 2-C$_2$H$_5$ | 4-NH— | —N(C$_2$H$_5$)— | 1 | 2PO/10EO-Me |
| 6 | H | 1-NHCH$_3$ | 2-Cl | 4-NH— | —N(CH$_3$,C$_6$H$_5$)— | 1 | 2PO/14EO-Me |
| 7 | 6-Cl | 1-NH$_2$ | 2-SCH$_3$ | 4-NH— | —N(C$_6$H$_5$)— | 1 | 9PO/1EO-Me |
| 8 | 6-CH$_3$ | 1-NHC$_6$H$_{11}$ | 2-OCH$_3$,5-CH$_3$ | 4-NH— | —NH— | 1 | 4PO—CH$_2$CH(OH)CH$_2$OH |
| 9 | 5-OCH$_3$ | 1-NHCH(CH$_3$)$_2$ | 2,5-di-CH$_3$ | 4-NH— | —HN—⟨C$_6$H$_4$⟩—O— | 1 | 1PO/3EO-nBu |
| 10 | H | 1,4-di-NH$_2$ | 2-OCH$_3$ | 2,3-di-O— | CH$_3$—N—⟨C$_6$H$_4$⟩—S— | 2 | 2PO/7EO-Me |
| 11 | H | 1-OH | 4-NHCOCH$_3$ | 2,4-di-NH— | CH$_3$—N—⟨C$_6$H$_4$⟩—S— | 2 | 10EO—CH$_2$CH(OH)CH$_2$OH |
| 12 | H | 1-NH$_2$,2-CH$_3$ | 3-OCH$_3$ | 4-S— | —HN—⟨C$_6$H$_4$⟩—C(O)—NH— | 1 | 2PO/11EO—C$_6$H$_5$ |

TABLE 1-continued (Anthraquinones)

| Example | $R_3$ | $R_4$ | $R_5$ | B | X | p | Y |
|---|---|---|---|---|---|---|---|
| 13 | H | 1-NH$_2$,4-OH | 4-C$_2$H$_5$ | 2-O— | 4-methylphenylamino-SO$_2$NH- | 1 | 2PO/19EO-Me |
| 14 | H | 1-NH$_2$,4-OH | 3-OC$_2$H$_5$ | 2-S— | 4-(N-methyl)aminophenylamino | 1 | 2PO/7EO-Me |
| 15 | H | 1-NH$_2$,4-OH | 3-CF$_3$ | 2-OC$_2$H$_4$— | 4-methylsulfonylphenylamino | 1 | 2BO/4EO-nBu |
| 16 | H | 1-NH$_2$,4-OH | 4-CH$_3$ | 2-OC$_2$H$_4$O— | —N(C$_6$H$_{11}$)— | 1 | 2PO/10EO-Me |
| 17 | H | 1-NH$_2$,4-OH | 3-OC(=O)CH$_3$ | 2-O— | 4-methylpiperazinyl | 1 | 25EO—H |
| 18 | H | H | 4-CH$_3$ | 1,4-di-NH— | —NH— | 2 | 2PO/4EO—C$_6$H$_5$ |
| 19 | H | H | 2,4,6-tri-CH$_3$ | 1,4-di-NH— | —NH— | 2 | 2PO/4EO-Me |
| 20 | 5,8-di-OH | H | 4-CH$_3$ | 1,4-di-NH— | —NH— | 2 | 2BO/3EO-nBu |
| 21 | H | 1-NH$_2$,2-OC$_6$H$_{11}$ | 4-CH$_3$ | 4-NH— | —NH— | 1 | 5PO/3EO—nC$_6$H$_{13}$ |
| 22 | 8-OH,5-NO$_2$ | 1-OH | 4-OCH$_3$ | 4-NH— | —NH— | 1 | 3BO/3EO-Me |
| 23 | 8-OH,5-NH$_2$ | 1-OH | 4-O-nC$_4$H$_9$ | 4-NH— | —NH— | 1 | 2PO/8EO-Me |
| 24 | 8-OH,5-NO$_2$ | H | 4-OCH$_3$ | 1,4-di-NH— | —NH— | 2 | 2BO/8EO-nBu |
| 25 | H | 1-OH | 4-OCH$_3$ | 4-NH— | —NH— | 1 | 2PO/10EO-Me |

TABLE 1-continued (Anthraquinones)

| Example | R₃ | R₄ | R₅ | B | X | p | Y |
|---|---|---|---|---|---|---|---|
| 26 | H | 1-OH | 4-CH₃ | 4-HN—C₆H₄—O—CH₃ | —NH— | 1 | 9PO/1EO-Me |
| 27 | H | 1-OH | 4-OCH₃ | 4-HN—C₆H₄—S—CH₃ | —NH— | 1 | 9PO/1EO-Et |
| 28 | H | H | H | 1,4-di-NHCH₂— | —N(C₆H₅)— | 2 | 15EO/5PO—H |
| 29 | H | 1-NH₂,2-SO₂C₆H₅ | H | 4-HN—C₆H₄—N(CH₃)CH₃ | —N(CH₃)— | 1 | 6BO/6EO—H |
| 30 | H | 1-NH₂,2-CN | 2-OCH₃ | 4-SCH₂CH₂S— | —N(—)₂ | 1 | (2PO/5EO—H)₂ |
| 31 | H | 1-NH₂,2-CF₃ | 2-OCH₃,5-CH₃ | 4-OCH₂CH₂S— | —NH— | 1 | 2PO/16EO-Me |
| 32 | H | H | 4-OCH₃ | 1-S— | —NH— | 1 | 2PO/14EO-Me |
| 33 | H | 1-NH₂ | 4-CH₃ | 2,4-di-S— | —NH— | 2 | 3BO/6EO—nC₆H₁₃ |
| 34 | 6,7-di-Cl | H | 4-C(CH₃)₃ | 1,4-di-NH— | —NH— | 2 | 2BO/3EO-Me |
| 35 | H | 1-NH₂,2-SO₂N(CH₃)₂ | 4-CH₃ | 4-NH— | —NH— | 1 | 3IPO/3EO-Me |
| 36 | H | 1-NHC₆H₁₁ | 2,5-di-OCH₃ | 4-NH— | —NHC₂H₄— | 1 | 2PO/10EO-Me |
| 37 | H | 1-NH₂,2-CONH₂ | 4-OC₂H₅ | 4-NH— | —NHC₂H₄N(CH₃)— | 1 | 2PO/19EO-Me |
| 38 | H | 1-NH₂,2-CO₂C₂H₅ | 2-OCH₃ | 4-HN—C₆H₄—N(CH₃)CH₃ | —NH— | 1 | 2PO/19EO-Me |
| 39 | 5-OH,8-NH₂ | 1-OH,4-NH₂ | 4-OCH₃ | 2-CB* | —NH— | 1 | 6PO—CH₂CHOHCH₂OH |
| 40 | H | 1-NH₂,2-COCH₃ | 4-C₂H₅ | 4-NH— | —NH— | 1 | 15PO—CH₂CHOHCH₂OH |

CB* = covalent bond

TABLE 2

(Anthraquinones)

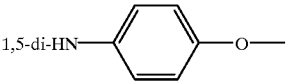

| Example | R₃ | R₄ | R₅ | B |
|---|---|---|---|---|
| 1 | H | H | 2-OCH₃ | 1,5-di-NH— |
| 2 | H | H | 2-OCH₃ | 1,8-di-NH— |
| 3 | 8-OH | 1-OH | 4-CH₃ | 4,5-di-NH— |
| 4 | 8-OH | 4-OH | 4-OC₂H₅ | 1,5-di-NH— |
| 5 | 8-NH₂ | 1-NH₂ | 4-CH₃ | 4,5-di-NH— |
| 6 | H | H | 4-CH₃ | 1,4,5,8-tetra-NH— |
| 7 | 8-OH | H | 4-CH₃ | 1,4,5-tri-NH— |
| 8 | 8-NH₂,7-Br | 1-NH₂,2-Br | 2-OC₂H₅ | 4,5-di-NH— |
| 9 | 8-NH₂ | 1-NH₂ | 4-C(CH₃)₃ | 4,5-di-S— |
| 10 | 5-NH₂,8-OH | 1-NH₂,4-OH | 4-CH₃ | 2,6-di-O— |
| 11 | H | H | 4-CH₃ | 1,5-di-S— |
| 12 | H | H | 4-C(CH₃)₃ | 1,8-di-S— |
| 13 | 8-NH₂ | 4-NH₂ | 4-CH₃ | 1,3,5,7-tetra-S— |
| 14 | 8-OH | 4-OH | 4-OCH₃ | 1,5-di-HN—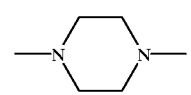—O— |
| 15 | 1-NHC₆H₁₁ | 8-NHC₆H₁₁ | 4-CH₃ | 4,5-di-NH— |

| Example | X | p | q | Y |
|---|---|---|---|---|
| 1 | —NH— | 1 | 1 | 2PO/7EO-Me |
| 2 | —NH— | 1 | 1 | 2PO/10EO-Me |
| 3 | —NH— | 1 | 1 | 9PO/1EO-Me |
| 4 | —NH— | 1 | 1 | 1PO/3EO-nBu |
| 5 | —NH— | 1 | 1 | 4PO—CH₂CHOHCH₂OH |
| 6 | —NH— | 2 | 2 | 2BO/4EO—C₆H₅ |
| 7 | —NH— | 2 | 1 | 2PO/10EO-Me |
| 8 | —N(CH₃)— | 1 | 1 | 2PO/10EO—H |
| 9 | piperazine | 1 | 1 | 2PO/6EO—H |
| 10 | —N(C₆H₅)— | 1 | 1 | 3PO/8EO—H |
| 11 | —N(C₆H₁₁)— | 1 | 1 | 2EO/10EO-Me |
| 12 | —N(-)₂ | 1 | 1 | (2PO/5EO—H)₂ |
| 13 | —NH— | 2 | 2 | 2BO/4EO-nBu |
| 14 | —NH— | 1 | 1 | 3PO/31EO-Me |
| 15 | —NH— | 1 | 1 | 2PO/14EO-Me |

TABLE 3

(Anthraquinones)

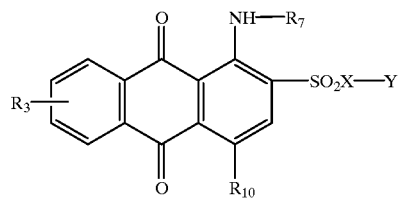

| Example | R₃ | R₇ | R₁₀ | X | Y |
|---|---|---|---|---|---|
| 1 | H | H | HN–C₆H₅ | —NH— | 2PO/19EO-Me |
| 2 | H | H | HN–C₆H₄–Cl (3-Cl) | —NH— | 2PO/31EO-Me |
| 3 | H | H | HN–C₆H₄–Br (4-Br) | —N(CH₃)— | 3PO/8EO—H |
| 4 | H | H | HN–C₆H₄–CF₃ (3-CF₃) | piperazine | 2PO/6EO—H |
| 5 | H | H | HN–C₆H₄–OCH₃ (4-OCH₃) | —N(CH₂CH₂OCH₃)— | 4PO/5EO—H |
| 6 | H | CH₃ | —S–benzothiazol-2-yl | —N(CH₂C₆H₅)— | 9PO/8EO—H |
| 7 | H | C₆H₁₁ | —S–C₆H₄–C(CH₃)₃ (4-tBu) | —NH— | 2BO/6EO—nC₆H₁₃ |
| 8 | H | H | —OH | —N(C₂H₅)— | 20EO—H |
| 9 | H | H | —NHSO₂CH₃ | —NH— | 31PO/3EO-Me |
| 10 | H | H | —HN–SO₂–C₆H₄–CH₃ | —NH— | 2PO/19EO-Me |
| 11 | H | H | —NHCOCH₃ | —NH— | 2PO/10EO-Me |
| 12 | H | H | —NHCOOC₂H₅ | —NH— | 2BO/4EO-nBu |
| 13 | H | H | —SCN | —NH— | 2PO/8EO—C₆H₅ |
| 14 | H | H | —NHCO–C₆H₅ | —NH— | 2PO/14EO-Me |

TABLE 3-continued (Anthraquinones)

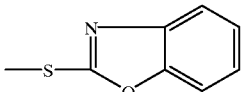

| Example | $R_3$ | $R_7$ | $R_{10}$ | X | Y |
|---|---|---|---|---|---|
| 15 | H | H | —NHCONHC$_2$H$_5$ | —NH— | 9PO/1EO-Me |
| 16 | H | H | (2-benzoxazolylthio) | —NH— | 2PO/14EO-Me |

TABLE 4

(Anthrapyridones)

| Example | $R_3$ | $R_4$ | $R_5$ | $R_6$ | $R_7$ |
|---|---|---|---|---|---|
| 1 | H | H | 4-CH$_3$ | H | —CH$_3$ |
| 2 | H | H | 4-CH$_3$ | CO$_2$C$_2$H$_5$ | —CH$_3$ |
| 3 | H | H | 4-CH$_3$ | COCH$_3$ | —CH$_3$ |
| 4 | H | H | 2-OCH$_3$ | COC$_6$H$_5$ | —CH(CH$_3$)$_2$ |
| 5 | H | H | 4-OCH$_3$ | CN | —CH$_3$ |
| 6 | H | H | 2,5-di-CH$_3$ | (tolyl) | —CH$_2$CH$_2$OCH$_3$ |
| 7 | H | H | 2-OCH$_3$,5-CH$_3$ | —S—(4-Cl-C$_6$H$_4$) | —CH$_2$CH$_2$—C$_6$H$_5$ |
| 8 | H | H | 2-OCH$_3$,5-Cl | —OC$_2$H$_5$ | —CH$_2$CH$_2$O—C$_6$H$_5$ |
| 9 | H | H | 2-OC$_2$H$_5$ | —SO$_2$C$_6$H$_5$ | —C$_6$H$_{11}$ |
| 10 | H | H | 3-Br | —SO$_2$CH$_3$ | H |
| 11 | H | H | 4-I | —CONH$_2$ | n-C$_4$H$_9$ |
| 12 | 8-CH$_3$ | H | 3-F | —NHC$_2$H$_5$ | —CH$_2$C$_6$H$_5$ |
| 13 | 9-Cl | H | 3-OC$_2$H$_5$ | —Cl | —CH$_3$ |

TABLE 4-continued (Anthrapyridones)

[Structure: Anthrapyridone core with positions labeled 1-11, with R6 at position 1, O at position 2, N-R7 at position 3, and substituents R3 (position 8), R4 (position 5), linked via B to a phenyl ring with R5, and SO2X—Y group, with bracket subscript p]

| | | | | | |
|---|---|---|---|---|---|
| 14 | H | H | 2-OCH₃ | [thiadiazole-S with CH₃] | —CH₃ |
| 15 | H | 4-Br | 2-CH₃ | [oxadiazole-S with CH₃] | —CH₃ |
| 16 | H | 4-OCH₃ | 4-CH₃ | —CO₂C₂H₅ | H |
| 17 | H | H | 4-CH₃ | —CO₂C₂H₅ | CH₃ |

| Example | B | X | p | Y |
|---|---|---|---|---|
| 1 | 6-NH— | —NH— | 1 | 2PO/14EO-Me |
| 2 | 6-NH— | —NH— | 1 | 9PO/1EO-Me |
| 3 | 6-NH— | —NH— | 1 | 3PO/19EO-Me |
| 4 | 6-NH— | —NH— | 1 | 2PO/7EO-Me |
| 5 | 6-NH— | —NH— | 1 | 2PO/11EO-Et |
| 6 | 6-NH— | —NH— | 1 | 4PO/8EO-nBu |
| 7 | 6-NH— | —N(CH₃)— | 1 | 8PO/1EO-Me |
| 8 | 6-NH— | —N(CH₂C₆H₅)— | 1 | 31PO/3EO-Me |
| 9 | 6-NH— | —N(-)₂ | 1 | (20EO—H)₂ |
| 10 | 6-S— | —NH— | 1 | 2PO/10EO-Me |
| 11 | 6-S— | —NH— | 1 | 2PO/31EO-Me |
| 12 | 6-S— | —NH— | 1 | 31PO/6EO—nC₆H₅ |
| 13 | 6-S— | —NH— | 1 | 31PO/3EO-Me |
| 14 | 6-NH— | —NH— | 1 | 8PO—CH₂CHOHCH₂OH |
| 15 | 6-NH— | —NH— | 1 | 2PO/19EO-Me |
| 16 | 4,6-di-S— | —NH— | 2 | 2BO/4EO-nBu |
| 17 | 6,8-di-NH— | —NH— | 2 | 2PO/7EO-Me |

TABLE 5

(Anthrapyridines)

[Structure: Anthrapyridine core with positions labeled 1-11, with R6 at position 2, R5 at position 1, N at position 3, and substituents R3 (position 8), R4 (position 5), R8, linked via B to a phenyl ring with R5, and SO2X—Y group, with bracket subscript p]

| Example | R₃ | R₄ | R₅ | R₆ | R₈ | B | X | p | Y |
|---|---|---|---|---|---|---|---|---|---|
| 1 | H | H | 4-CH₃ | CN | —N(C₂H₅)₂ | 6-NH— | —NH— | 1 | 2PO/10EO-Me |
| 2 | H | H | 4-OCH₃ | CN | [morpholino] | 6-NH— | —NH— | 1 | 2PO/7EO-Me |

TABLE 5-continued (Anthrapyridines)

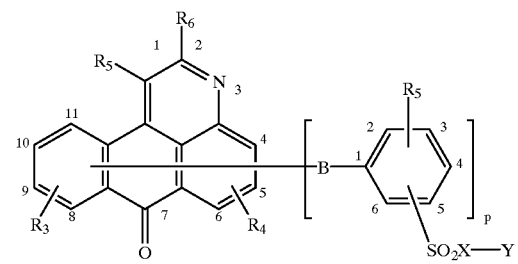

| Example | R$_3$ | R$_4$ | R$_5$ | R$_6$ | R$_8$ | B | X | p | Y |
|---|---|---|---|---|---|---|---|---|---|
| 3 | H | H | 2-OCH$_3$ | CONH$_2$ | (N-piperidinyl) | 6-NH— | —NH— | 1 | 2PO/14EO-Me |
| 4 | H | H | 2,5-di-OCH$_3$ | CO$_2$C$_2$H$_5$ | —N(CH$_3$)C$_2$H$_5$ | 6-NH— | —NH— | 1 | 2PO/19EO-Me |
| 5 | H | H | 2-I | COC$_6$H$_5$ | —N(CH$_3$)C$_6$H$_5$ | 6-NH— | —N(CH$_3$)— | 1 | 31PO/3EO-Me |
| 6 | H | H | 4-C$_2$H$_5$ | COCH$_3$ | —N(CH$_3$)C$_6$H$_5$ | 6-NH— | —N(C$_6$H$_5$)— | 1 | 2BO/6EO—nC$_6$H$_{13}$ |
| 7 | H | H | 4-Cl | CN | —NH(CH$_3$) | 4,6-di-NH— | —N(C$_2$H$_5$)— | 2 | 9PO/1EO-Me |
| 8 | 9,10-di-CH$_3$ | H | 2-OCH$_3$ | CN | —N(nC$_4$H$_9$)$_2$ | 6-NH— | —NH— | 1 | 2PO/8EO—C$_6$H$_5$ |
| 9 | 8-OCH$_3$ | H | 2-OC$_2$H$_5$ | CN | —N(CH$_2$C$_6$H$_5$)$_2$ | 6-S— | —NH— | 1 | 2PO/31EO-Me |
| 10 | H | 4-Br | 2,6-di-CH$_3$ | CN | —N(CH$_3$)C$_2$H$_4$C$_6$H$_5$ | 6-NH— | —NH— | 1 | 2PO/7EO-Me |
| 11 | H | 4-SCN | 2-CH$_3$ | CN | (N-piperidinyl) | 6-S— | —NH— | 1 | 2PO/10EO-Me |
| 12 | 8-CH$_3$ | 4-OCH$_3$ | 2-C$_2$H$_5$ | CN | (N-morpholinyl) | 6-NH— | —NH— | 1 | 2PO/14EO-Me |
| 13 | 9-Cl | 4-SO$_2$C$_6$H$_5$ | 4-nC$_4$H$_9$ | CN | —N(C$_2$H$_5$)$_2$ | 6-NH— | —NH— | 1 | 2PO/10EO—nC$_6$H$_{13}$ |
| 14 | H | H | 2-OCH$_3$ | CN | —N(CH$_3$)$_2$ | 6,8-di-NH— | —NH— | 2 | 9PO/1EO-Me |
| 15 | H | H | 2-CH$_3$ | CN | —N(C$_2$H$_4$OC$_2$H$_5$)$_2$ | 8-NH— | —NH— | 1 | 2PO/31EO-Me |
| 16 | H | 6-NH$_2$ | 2-OC$_2$H$_5$ | CN | —N(C$_2$H$_5$)CH$_2$C$_6$H$_5$ | 8-NH— | —NH— | 1 | 2BO/8EO-nBu |

TABLE 6

(Anthrapyrimidines)

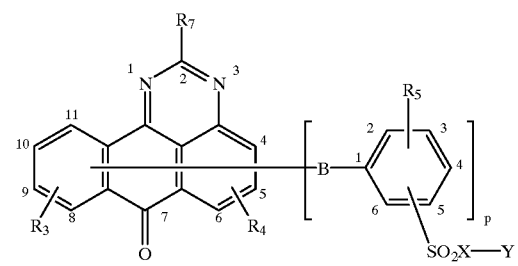

| Example | R$_3$ | R$_4$ | R$_5$ | R$_7$ | B | X | p | Y |
|---|---|---|---|---|---|---|---|---|
| 1 | H | H | 4-CH$_3$ | H | 6-NH— | —NH— | 1 | 2BO/6EO-nBu |
| 2 | H | H | 2-OCH$_3$ | CH$_3$ | 6-NH— | —NH— | 1 | 2PO/19EO-Me |
| 3 | H | H | 2-OC$_2$H$_5$ | C$_2$H$_5$ | 6-NH— | —N(CH$_3$)— | 1 | 2PO/31EO-Me |
| 4 | H | H | 2-CH$_3$ | C$_6$H$_5$ | 4,6-di-NH— | —NH— | 2 | 9PO/1EO-Me |
| 5 | H | H | 2-C$_2$H$_5$ | C$_6$H$_4$-p-CH$_3$ | 6-S— | —NH— | 1 | 4BO/4EO-nBu |
| 6 | 8-CH$_3$ | H | 2-Cl | C$_6$H$_4$-p-Cl | 6-S— | —NH— | 1 | 2PO/8EO—C$_6$H$_5$ |
| 7 | 8,11-di-CH$_3$CH$_3$ | H | 3-F | C$_6$H$_4$-o-Br | 6-S— | —NH— | 1 | 4PO/20EO-Me |

TABLE 6-continued (Anthrapyrimidines)

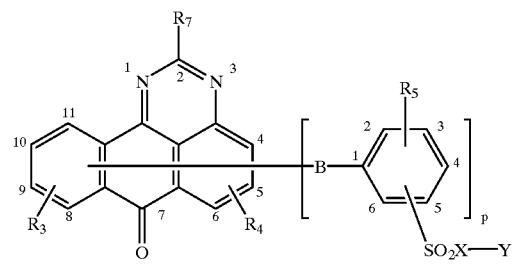

| Example | $R_3$ | $R_4$ | $R_5$ | $R_7$ | B | X | | p | Y |
|---|---|---|---|---|---|---|---|---|---|
| 8 | H | 4-Br | 2-OCH$_3$ | C$_6$H$_{11}$ | 6-NH— | —HN—⟨⟩—O— | | 1 | 3PO/14EO-Me |
| 9 | H | 4-OMe | 2-OCH$_3$ | CH$_3$ | 6-NH— | —HN—⟨⟩(O—) | | 1 | 2PO/7EO-Me |
| 10 | H | 4-CF$_3$ | 2,5-di-CH$_3$ | CH$_3$ | 6-NH— | —HNCH$_2$CH$_2$—⟨⟩— | | 1 | 3PO/14PO-Me |
| 11 | H | 4-CH$_3$ | 2,5-di-OCH$_3$ | C$_6$H$_5$ | 6-NH— | —HNCH$_2$CH$_2$O—⟨⟩—O— | | 1 | 2PO/7EO-Me |
| 12 | H | 4-Cl | 2,5-di-Cl | C$_6$H$_5$ | 6-NH— | —N⟨N⟩—⟨⟩—O— | | 1 | 2PO/14EO-Me |
| 13 | H | H | 4-CH$_3$ | C$_6$H$_5$ | 6,8-di-NH— | —NH— | | 2 | 2BO/4EO-nBu |
| 14 | H | 6-NHC$_2$H$_5$ | 4-CH$_3$ | C$_6$H$_5$ | 11 NH— | —NH— | | 1 | 9PO/1EO-Me |
| 15 | H | 4-SO$_2$CH$_3$ | 2-C$_2$H$_5$ | CH$_3$ | 6-NH— | —NH—⟨⟩—S— | | 1 | 2PO/10EO-Me |

TABLE 7

(Phthaloylphenothiazines)

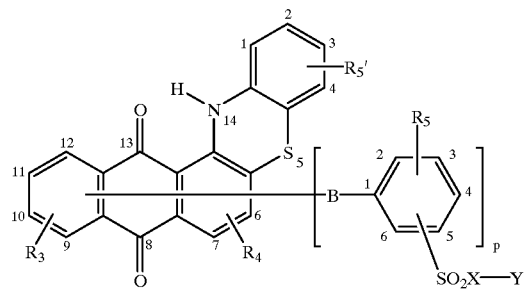

| Example | R₃ | R₅ | R₅' | R₄ | B | X | p | Y |
|---|---|---|---|---|---|---|---|---|
| 1 | H | H | H | H | 7-NH— | —NH— | 1 | 9PO/1EO-Me |
| 2 | 10 or 11 CH₃ | 4-CH₃ | H | H | 7-NH— | —NH— | 1 | 2PO/7EO-Me |
| 3 | 10 or 11 CH₃ | 2-OCH₃ | H | H | 7-NH— | —NH— | 1 | 2PO/19EO-Me |
| 4 | H | 3-CH₃ | 3-CH₃ | H | 7-NH | —NH— | 1 | 2BO/4EO—C₆H₅ |
| 5 | H | 3-OCH₃ | 2-Cl | H | 7-NH | —NH— | 1 | 2PO/31EO-Me |
| 6 | H | 3-Br | 2,3-di-Cl | H | 7-NH— | —N(CH₃)— | 1 | 2PO/10EO—H |
| 7 | H | 4-CH₃ | H | H | 7,9-di-NH— | —N(C₆H₅)— | 2 | 25EO—H |
| 8 | H | 4-CH₃ | H | 7-OH | 9 NH— | —N(C₆H₁₁)— | 1 | 4BO/20PO—H |
| 9 | H | 4-CH₃ | H | 7-OH | 10,11-di-O— | —N(CH₂C₆H₅)— | 2 | 2EO/10PO—H |
| 10 | H | 4-CH₃ | H | 7-NH₂ | 10-S— | —NH— | 1 | 2PO/14EO-Me |
| 11 | H | 4-C₂H₅ | H | 7-NHC₂H₅ | 10 or 11-O— | —N(-)₂ | 1 | (4PO/6EO—H)₂ |

TABLE 8

(Phthaloylphenothiazines)

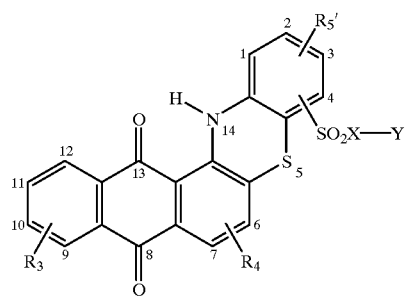

| Example | R₃ | R₄ | R₅' | X | Y |
|---|---|---|---|---|---|
| 1 | H | H | H | —NH— | 9PO/1EO-Me |
| 2 | H | 7-OH | H | —NH— | 2PO/14EO-Me |
| 3 | H | 7-OH | 3-OCH₃ | —NH— | 2PO/7EO-Me |
| 4 | H | 7-OH | 3-CH₃ | —NH— | 2PO/10EO-Me |
| 5 | H | 7-OH | 2-Cl | —NH— | 2PO/19EO-Me |
| 6 | 10 or 11-CO₂CH₃ | 7-OH | 3-Br | —NH— | 9PO—CH₂CHOHCH₂OH |
| 7 | 9 or 10-CH₃ | 7-OH | 3-C₂H₅ | —NHCH₂CH₂CH₂— | 6BO/6EO—CH₂CHOHCH₂OH |
| 8 | H | 7-NH₂ | 3-CH₃ | —HN—C₆H₄—N(CH₃)₂ | 2PO/15EO—H |
| 9 | H | 7-NH₂ | 3-OCH₃ | —N(-)₂ | (20EO—H)₂ |
| 10 | H | 7-SC₂H₅ | 3-CH₃ | —HN—C₆H₄—N(CH₃)₂ | (4PO/15EO—H)₂ |

TABLE 9

(1 H-Anthra(2,1-b)(1,4)thiazine-7,12-diones)

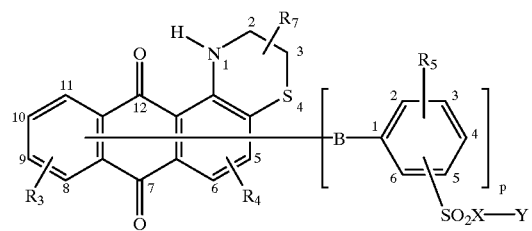

| Example | $R_3$ | $R_4$ | $R_5$ | $R_7$ | B | X | | p | Y |
|---|---|---|---|---|---|---|---|---|---|
| 1 | H | H | 4-CH$_3$ | H | 6-NH— | —NH— | | 1 | 3PO/19EO-Me |
| 2 | 8-CH$_3$ | H | 2-OCH$_3$ | 2-CH$_3$ | 6-NH— | —NH— | | 1 | 2PO/10EO-Me |
| 3 | 8,11-di-CH$_3$ | H | 2-CH$_3$ | 3-CH$_3$ | 6-NH— | —NH— | | 1 | 2PO/14EO-Me |
| 4 | H | H | 2-OCH$_3$, 5-CH$_3$ | 2 or 3-C$_6$H$_5$ | 6-NH— | —NH— | | 1 | 9PO/1EO-Me |
| 5 | H | H | 2,5-di-OCH$_3$ | H | 6-S— | —HN—⌬—S(O)$_2$—CH$_3$ | | 1 | 2PO/10EO—C$_6$H$_5$ |
| 6 | H | H | 3-Cl | H | 6-S— | —HN—⌬—S(O)$_2$—NH— | | 1 | 2BO/6EO-nBu |
| 7 | H | H | 3-OCH$_3$ | H | 6-NH— | —HN—⌬—N(CH$_3$)$_2$ | | 1 | (30EO—H)$_2$ |
| 8 | H | H | 4-CH$_3$ | H | 6,8-di-NH— | —N(CH$_3$)— | | 2 | 2PO/7EO-Me |
| 9 | H | 6-OH | 4-C$_2$H$_5$ | H | 9 or 10-NH— | —N(-)$_2$ | | 1 | (2EO/15PO—H)$_2$ |
| 10 | H | 6-NH$_2$ | 4-CH$_3$ | H | 8-NH— | —NH— | | 1 | 31PO/3EO-Me |
| 11 | H | 6-NHC$_2$H$_5$ | 4-O—nC$_4$H$_9$ | H | 6,8-di-S— | —NH— | | 2 | 2PO/7EO-Me |
| 12 | H | 6-NHSO$_2$CH$_3$ | 4-CH$_3$ | H | 9-OC$_2$H$_4$O— | —NH— | | 1 | 2PO/10EO-Me |

TABLE 10

(Phthaloylphenoxazines)

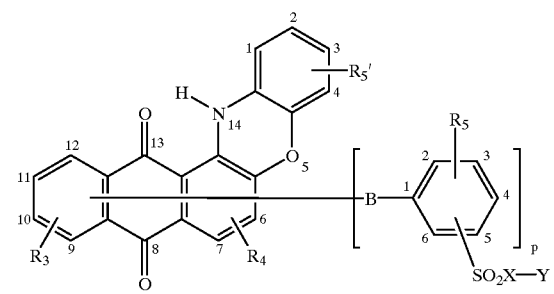

| Example | $R_3$ | $R_4$ | $R_5$ | $R_{5'}$ | B | X | p | Y |
|---|---|---|---|---|---|---|---|---|
| 1 | H | 7-OH | 4-CH$_3$ | H | 9-NH— | —NH— | 1 | 2PO/14EO-Me |
| 2 | H | 7-OH | 2-OCH$_3$ | H | 9,12-NH— | —NH— | 1 | 2PO/7EO-Me |
| 3 | H | 7-NH$_2$ | 3-Cl | 3-CH$_3$ | 10-OC$_2$H$_4$S— | —N(CH$_3$)— | 1 | 9PO/1EO-Me |
| 4 | H | 7-NHC$_2$H$_5$ | 2,5-di-CH$_3$ | 4-Cl | 10-OC$_2$H$_4$O— | —N(C$_2$H$_5$)— | 1 | 5PO/2EO—nC$_6$H$_5$ |
| 5 | H | 7-NH(C=O)C$_6$H$_5$ | 2,5-di-OCH$_3$ | 2-OCH$_3$ | 10 or 11-S— | —N(-)$_2$ | 1 | (50EO—H)$_2$ |
| 6 | H | H | 4-CH$_3$ | H | 7-NH— | —NH— | 1 | 10PO—CH$_2$CHOHCH$_2$OH |

TABLE 10-continued (Phthaloylphenoxazines)

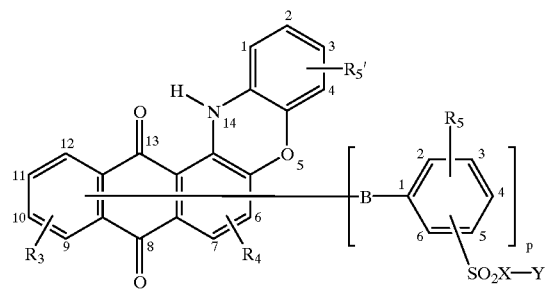

| Example | R₃ | R₄ | R₅ | R₅' | B | X | p | Y |
|---|---|---|---|---|---|---|---|---|
| 7 | H | H | 4-C₂H₅ | H | 7,9-di-NH— | —N(C₆H₅)— | 1 | 100EO—H |
| 8 | H | H | 4-OCH₃ | H | 7 NH— | —N(C₆H₁₁)— | 1 | 150EO—H |
| 9 | H | H | 4-OCH₃ | H | 7-S— | —NH— | 1 | 9PO/1EO-Me |
| 10 | H | H | 4-C₂H₅ | H | 9-NH— | —NH— | 1 | 2PO/10EO-Me |
| 11 | 9,12-di-CH₃ | H | 4-CH₃ | H | 7-NH— | —NH— | 1 | 8PO/10EO-nBu |

TABLE 11

(Benzanthrones)

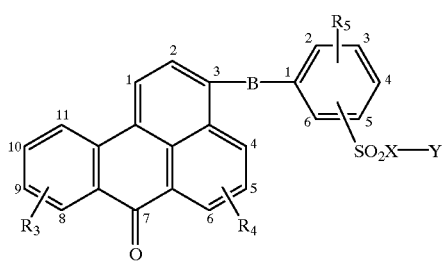

| Example | R₃ | R₄ | R₅ | B | X | Y |
|---|---|---|---|---|---|---|
| 1 | H | H | 4-CH₃ | —S— | —NH— | 2PO/10EO-Me |
| 2 | H | 6-NH₂ | 2-OCH₃ | —O— | —NH— | 31PO/3EO-Me |
| 3 | H | H | 2,5-di-OCH₃ | —NH— | —N(CH₃)— | 4EO/20PO—H |
| 4 | H | H | 2-OCH₃,5-Cl | —NH— | —N(-)₂ | (200EO—H)₂ |
| 5 | H | H | 2,5-di-CH₃ | —NHC₂H₄O— | —NH— | 2PO/14EO-Me |
| 6 | H | H | 4-O-nC₄H₉ | —NHC₂H₄OC₂H₄O— | —NH— | 2PO/31EO-Me |
| 7 | 8,11-di-CH₃ | H | 4-O—C₆H₁₁ | —NHCH₂— | —N⟨piperazine⟩N— | 100EO—H |
| 8 | 9 or 11-OCH₃ | 6-NH—C₂H₅ | 4-CH₃ | —NHCH₂CH₂S— | —N(C₆H₁₁)— | 10EO/10PO—H |
| 9 | H | 6-S—nC₄H₉ | 4-Cl | —NHCH₂CH₂N(CH₃)— | —NH— | 2PO/19EO-Me |
| 10 | H | 6-OH | 4-nC₄H₉ | —NHCH₂CH₂— | —NH— | 2PO/10EO-Me |

TABLE 12

(Phthaloylacridones)

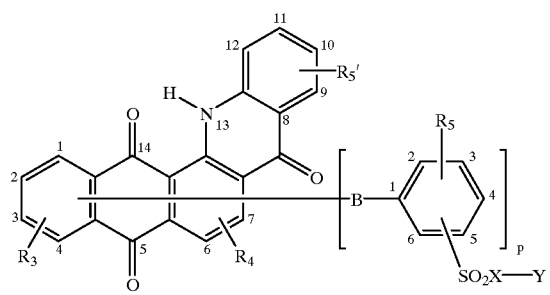

| Example | $R_3$ | $R_4$ | $R_5$ | $R_{5'}$ | B | X | p | Y |
|---|---|---|---|---|---|---|---|---|
| 1 | H | H | 4-CH$_3$ | H | 6-NH— | —NH— | 1 | 2PO/14EO-Me |
| 2 | H | H | 2-OCH$_3$ | H | 6-S— | —NH— | 1 | 2PO/10EO-Me |
| 3 | H | H | 2-OC$_2$H$_5$ | 3-CH$_3$ | 6-NH— | —N(CH$_3$)— | 1 | 20EO—H |
| 4 | 10,11-di-CH$_3$ | H | 3-CH$_3$ | 3-Cl | 6-NH— | —N(C$_6$H$_5$)— | 1 | 20EO/40PO—H |
| 5 | 9,12,-di-CH$_3$ | H | 2,5-di-OCH$_3$ | 3-OC$_2$H$_5$ | 6-NH— | —NCH$_2$C$_6$H$_5$)— | 1 | 50EO/50PO—H |
| 6 | H | NH$_2$ | 4-CH$_3$ | H | 3-S— | —NH— | 1 | 2PO/19EO-Me |
| 7 | H | NHC$_2$H$_5$ | 4-nC$_4$H$_9$ | 3-Cl | 4-NH— | —NH— | 1 | 2PO/31EO-Me |
| 8 | 1,4-di-CH$_3$ | H | 4-CH$_3$ | H | 4,6-di-NH— | —NH— | 2 | 2PO/7PO-Me |

TABLE 13

(8H-Naphtho[2,3-c]thioxanthene-5,8,14-triones)

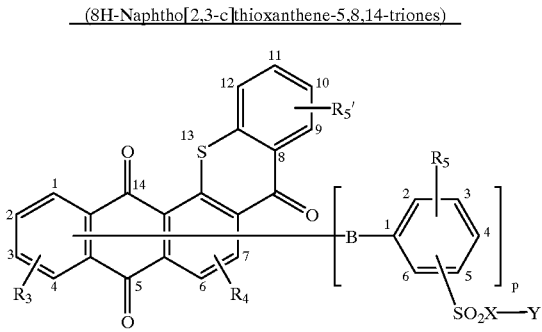

| Example | $R_3$ | $R_4$ | $R_5$ | $R_{5'}$ | B | X | p | Y |
|---|---|---|---|---|---|---|---|---|
| 1 | H | H | 4-CH$_3$ | H | 6-NH— | —NH— | 1 | 2PO/10EO—H |
| 2 | H | H | 4-OCH$_3$ | 12-CH$_3$ | 6-NH— | —N(CH$_3$)— | 1 | 2PO/19EO—H |
| 3 | H | H | 2-OCH$_3$ | 10-OCH$_3$ | 6-NH— | —N(C$_6$H$_5$)— | 1 | 9PO/1EO-Me |
| 4 | H | H | 2,5-di-Cl | 11-Cl | 6-NH— | —N(-)$_2$ | 1 | (150EO—H)$_2$ |
| 5 | H | H | 4-nC$_4$H$_9$ | H | 6-S— | —NH— | 1 | 2BO/9EO-nBu |
| 6 | H | 6-NH$_2$ | 4-CH$_3$ | H | 4-NH— | —NH— | 1 | 3PO/6EO—nC$_6$H$_{13}$ |
| 7 | H | H | 4-CH$_3$ | H | 4,6-di-NH— | —NH— | 2 | 2PO/7EO-Me |
| 8 | 1,4-di-CH$_3$ | H | 2-OC$_2$H$_5$ | H | 6-NHCH$_2$— | —NH— | 1 | 2PO/10EO—C$_6$H$_5$ |

TABLE 14

(Anthrapydridazones)

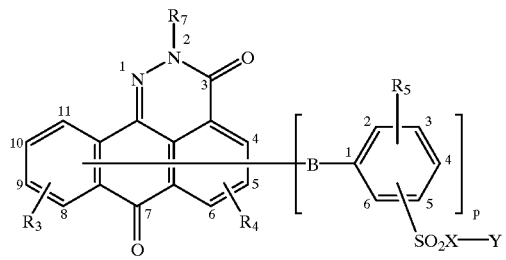

| Example | $R_3$ | $R_4$ | $R_5$ | $R_7$ | B | X | p | Y |
|---|---|---|---|---|---|---|---|---|
| 1 | H | H | 4-$CH_3$ | H | 6-NH— | —NH— | 1 | 2PO/19EO-Me |
| 2 | H | H | 2-$OCH_3$ | $CH_3$ | 4,6-di-NH— | —NH— | 2 | 2PO/7EO-Me |
| 3 | H | H | 3-Cl | $C_6H_5$ | 6,8-di-NH— | —N($CH_3$)— | 2 | 2PO/6EO-nBu |
| 4 | H | H | 2-$OCH_3$,5-$CH_3$ | $CH_2CH_2OC_2H_5$ | 8-NH— | —N($C_6H_5$)— | 1 | 2PO/14EO-Me |
| 5 | H | 6-$NH_2$ | 4-$OC_2H_5$ | $C_2H_4OC(=O)CH_3$ | 9-S— | —N$C_2H_5$)— | 1 | 2BO/8EO-nBu |
| 6 | 8,11-di-$CH_3$ | H | 2-$OCH_3$,5-Cl | $CH_2CH_2CN$ | 6-S— | —NH— | 1 | 2PO/10EO-Me |
| 7 | H | 6-$NHC_2H_5$ | 4-$OC_2H_5$ | $CH_2CH_2Cl$ | 9 or 10-S— | —NH— | 1 | 2PO/31EO-Me |
| 8 | H | 6-$NHC_6H_{11}$ | 4-$nC_4H_9$ | $C_6H_{11}$ | 9-O— | —NH— | 1 | 2PO/11EO—$C_6H_5$ |
| 9 | 8-$NH_2$ | H | 4-$CH(CH_3)_2$ | $CHCH_2CH(CH_3)$ | 6-NH— | —N(—)$_2$ | 1 | (20EO/40PO—H)$_2$ |
| 10 | 8-$NH_2$ | 6-$NH_2$ | 2-$OCH_3$ | H | 5,9-di-NH— | —NH— | 2 | 2PO/10EO-Me |

TABLE 15

(Anthrapyrazoles)

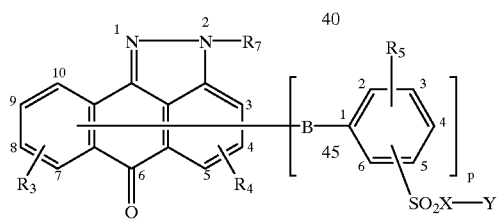

| Example | $R_3$ | $R_4$ | $R_5$ | $R_7$ | B | X | p | Y |
|---|---|---|---|---|---|---|---|---|
| 1 | H | H | H | H | 3,5-di-NH— | —NH— | 2 | 2PO/7EO-Me |
| 2 | H | 3-Br | H | H | 5-NH— | —NH— | 1 | 2PO/19EO-Me |
| 3 | H | 3-$OCH_3$ | 4-$CH_3$ | H | 5-NH— | —N($CH_3$)— | 1 | 2PO/10EO—H |
| 4 | H | 3-$SO_2C_6H_5$ | 2-$OCH_3$ | $CH_3$ | 5,7-di-NH— | —N$C_2H_5$)— | 2 | 2PO/5EO-Me |
| 5 | H | H | 2-$CH_3$ | $C_6H_5$ | 3,5-di-S— | —N($C_6H_5$)— | 2 | 2PO/10EO-Me |
| 6 | 8-$CH_3$ | 3-S—$nC_4H_9$ | 2-$C_2H_5$ | $C_6H_{11}$ | 5-NH— | —NH— | 1 | 30EO/60PO—H |
| 7 | 7-$NH_2$ | 5-$NH_2$ | 2-$OCH_3$,5-$CH_3$ | $CH_2C_6H_5$ | 4-S— | —NH— | 1 | 2PO/14EO-Me |
| 8 | 8 or 9-$OC_2H_5$ | H | 2,5-di-$OCH_3$ | $CH_2CH_2O(C=O)CH_3$ | 5-S— | —NH— | 1 | 3PO/19EO-Me |
| 9 | H | 5-$NHC_2H_5$ | 2-$OC_2H_5$ | $CH_2CH_3$ | 3-O— | —NH— | 1 | 31PO/3EO-Me |
| 10 | H | 5-$NHC_6H_{11}$ | 2,6-di-$CH_3$ | H | 5-NH— | —NH— | 1 | 9PO/1EO-Me |

TABLE 16

(Anthraisothiazoles)

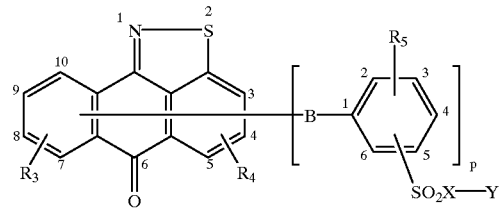

| Example | $R_3$ | $R_4$ | $R_5$ | B | X | p | Y |
|---|---|---|---|---|---|---|---|
| 1 | H | H | 2-CH$_3$ | 5-NH— | —NH— | 1 | 2PO/14EO-Me |
| 2 | H | H | 2-OCH$_3$ | 3,5-di-S— | —NH— | 2 | 2PO/7EO-Me |
| 3 | H | H | 4-CH$_3$ | 5,7-di-NH— | —N(CH$_3$)— | 2 | 30EO—H |
| 4 | 7-NH$_2$ | 5-NH$_2$ | 4-OC$_2$H$_5$ | 4,8-di-S— | —N(C$_6$H$_5$)— | 2 | 20EO—H |
| 5 | H | H | 4-Cl | 5,7-di-S— | —N(C$_2$H$_5$)— | 2 | 10EO/10PO—H |
| 6 | H | H | 4-C(CH$_3$)$_3$ | 8-S— | —NH— | 1 | 2PO/19EO-Me |
| 7 | 7,10-di-CH$_3$ | 5-NH—C$_6$H$_5$ | 2-OCH$_3$,5-CH$_3$ | 4-O— | —NH— | 1 | 9PO/1EO-Me |
| 8 | 7,10-di-NH$_2$ | H | 2,5-di-OCH$_3$ | 5-NH— | —NH— | 1 | 6PO/15EO-nBu |

TABLE 17

(Naphtho[1',2',3';4,5]quino[2,1-b]quinazoline-5,10-diones)

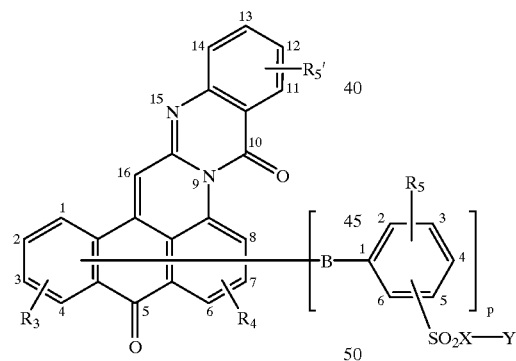

| Example | $R_3$ | $R_4$ | $R_5$ | $R_{5'}$ | B | X | p | Y |
|---|---|---|---|---|---|---|---|---|
| 1 | H | H | 4-CH$_3$ | H | 6-NH— | —NH— | 1 | 3PO/19EO-Me |
| 2 | H | 6-NH$_2$ | 4-OCH$_3$ | 12-CH$_3$ | -8-O— | —NH— | 1 | 2PO/14EO-Me |
| 3 | H | 6-NHC$_2$H$_5$ | 2-OCH$_3$ | 13-Cl | -8-S— | —NH— | 1 | 2PO/20EO—C$_6$H$_5$ |
| 4 | H | H | 2,5-di-CH$_3$ | 12-OCH$_3$ | 6,8-di-S— | —NH— | 2 | 2PO/7EO-Me |
| 5 | H | H | 2,5-di-OCH$_3$ | H | 4-NH— | —N(CH$_3$)— | 1 | 4BO/10EO-nBu |
| 6 | 2,3-di-CH$_3$ | H | 3,4-di-CH$_3$ | H | 6-NHCH$_2$CH$_2$— | —N(-)$_2$ | 1 | (200EO—H)$_2$ |
| 7 | 4-NH$_2$ | 6-NH$_2$ | H | H | 7-S— | —NH— | 1 | 9PO/1EO-Me |
| 8 | 4-NH$_2$ | 6-NH$_2$ | 4-C(CH$_3$)$_3$ | H | 7-O— | —N(C$_6$H$_5$)— | 1 | 15EO/15PO—H |
| 9 | H | H | 4-OC$_2$H$_5$ | 12-CH$_3$ | 4,6-di-NH— | —NH— | 2 | 2PO/10EO-Me |

TABLE 18

A—SO₂N(R₁)—Y—N(R₁)SO₂—A

| Entry | A | R₁ | Y |
|-------|---|----|----|
| 1 | 1-amino-4-hydroxy-2-(4-methylphenoxy)anthraquinone | H | 1PO/9EO/1PO |
| 2 | 1-hydroxy-4-(4-methylphenylamino)anthraquinone | H | 1PO/16EO/1PO |
| 3 | 1,4-diamino-2-(4-methylphenylthio)anthraquinone | H | 6PO |
| 4 | benzo[a]phenothiazine anthraquinone derivative with OH | CH₃ | 10EO |
| 5 | 1-amino-4-hydroxy-2-methylanthraquinone | H | 33PO |
| 6 | N-methyl benzo[de]isoquinoline-dione with (4-methylphenyl)amino | H | 1PO/86EO/1PO |

TABLE 19
A—SO₂N(R₁)—Y—[N(R₁)SO₂—A]₂
| Entry | A | R₁ | Y |
|---|---|---|---|
| 1 | 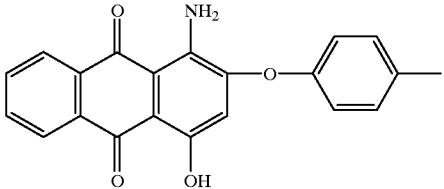 | H | 2PO—C(CH₃)[CH₂—2PO]₂ |
| 2 | 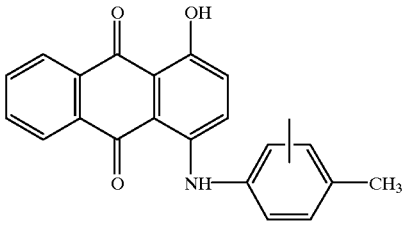 | H | 2PO—C(H)[CH₂—2PO]₂ |
| 3 | 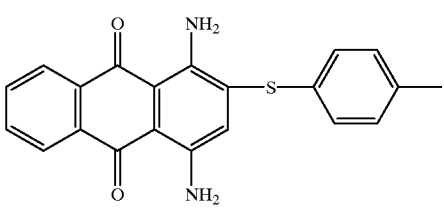 | H | 4PO—C(C₂H₅)[CH₂—4PO]₂ |
| 4 | 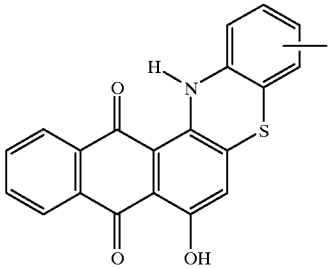 | CH₃ | 2PO/2EO—C(H)[CH₂—2EO/2PO]₂ |
| 5 | 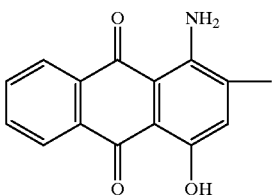 | H | 2PO—C(CH₃)[CH₂—2PO]₂ |
| 6 | 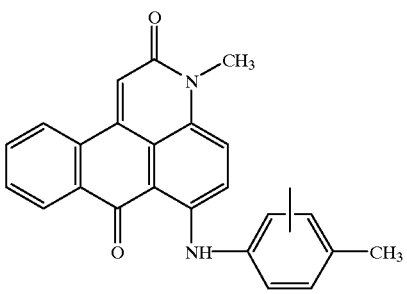 | H | 6PO—C(CH₃)[CH₂—6PO]₂ |

TABLE 20

$$A-[SO_2-X-(Y)_{1-2}]_p$$

| Entry | A | X | Y | p |
|---|---|---|---|---|
| 1 | 1-amino-2-(p-tolyloxy)-4-hydroxyanthraquinone | N-methylpiperazinyl | 9PO/1EO-Me | 1 |
| 2 | 1,4-diamino-2,3-bis(p-tolyloxy)anthraquinone | 4-(4-methoxyphenyl)piperazinyl | 4PO—CH$_2$CH(OH)CH$_2$OH | 2 |
| 3 | 1,4-diamino-2-(p-tolylthio)anthraquinone | 4-(2-(dimethylamino)ethyl)piperazinyl | (3PO/19EO-Me)$_2$ | 1 |
| 4 | phenothiazine-anthraquinone fused (hydroxy) | 4-methoxypiperidinyl | 2PO/7EO-Me | 1 |
| 5 | 1-hydroxy-4-(tolylamino)anthraquinone | N-methylpiperazinyl | 9PO/1EO-Me | 1 |
| 6 | 1-amino-2-methyl-4-hydroxyanthraquinone | 3-(dimethylamino)pyrrolidinyl | (4PO—CH$_2$CH(OH)CH$_2$OH)$_2$ | 1 |

TABLE 20-continued

A—[SO$_2$—X—(Y)$_{1-2}$]$_p$

| Entry | A | X | Y | p |
|---|---|---|---|---|
| 7 | [anthrapyridone structure with N-CH$_3$ and NH-tolyl-CH$_3$ substituent] | [N-methylpiperazine-CH$_2$CH$_2$N(Me)$_2$] | (3PO/19EO-Me)$_2$ | 1 |
| 8 | [benzothiazine-fused anthraquinone with NH, S, OH] | [1,4-dimethyl-1,4-thiadiazepane-1,1-dioxide] | 2PO/14EO-Me | 1 |

TABLE 21

A-[B-Ar-SO$_2$N(R$_1$)—Y]$_p$

| Entry | A | B | Ar |
|---|---|---|---|
| 1 | [1-amino-4-hydroxyanthraquinone with methyl] | O | [1,4-naphthalene] |
| 2 | [1-amino-4-hydroxyanthraquinone with methyl] | O | [dibenzofuran with methyl] |
| 3 | [1-amino-4-hydroxyanthraquinone with methyl] | O | [dibenzothiophene with methyl] |

TABLE 21-continued

A-[B-Ar-SO$_2$N(R$_1$)—Y]$_p$

| | A | B | Y |
|---|---|---|---|
| 4 | 1-amino-2-methyl-4-hydroxyanthraquinone | O | carbazol-diyl (NH) |
| 5 | 1,4-diamino-2-methylanthraquinone | S | dibenzofuran-diyl |
| 6 | 1-amino-2-methyl-4-hydroxyanthraquinone | O | dibenzothiophene-S,S-dioxide-diyl |
| 7 | 1-amino-2-methyl-4-hydroxyanthraquinone | O | N-methylcarbazol-diyl |
| 8 | 1-amino-2-methyl-4-hydroxyanthraquinone | OC$_2$H$_4$O | dibenzofuran-diyl |
| 9 | 1-amino-2-methyl-4-hydroxyanthraquinone | O | biphenyl-diyl |
| 10 | 1-methylamino-4-methylanthraquinone | OCH$_2$ | thiophene-2,5-diyl |

TABLE 21-continued
A-[B-Ar-SO$_2$N(R$_1$)—Y]$_p$
| | | | |
|---|---|---|---|
| 11 | 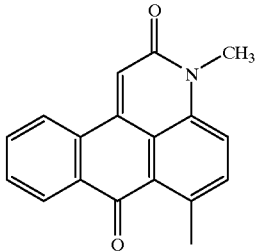 | OC$_2$H$_4$ | 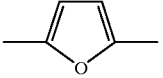 |
| 12 | 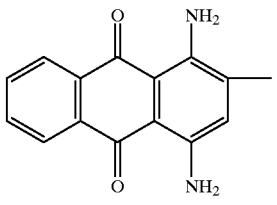 | S | 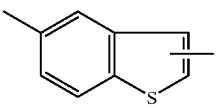 |
| 13 | 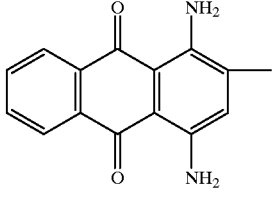 | covalent bond | 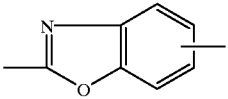 |
| 14 | 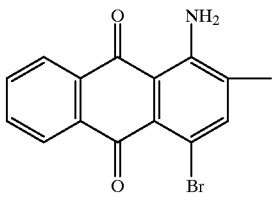 | SO$_2$NH | 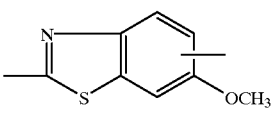 |
| 15 | 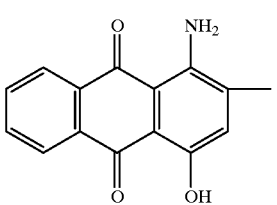 | OCH$_2$ | 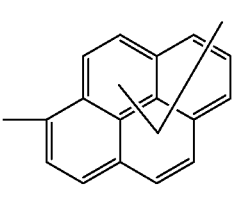 |
| 16 | 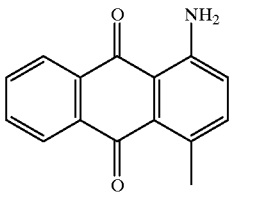 | O | 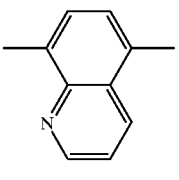 |
| 17 | 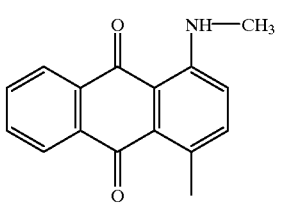 | S | 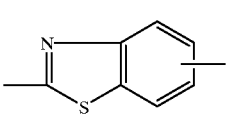 |

TABLE 21-continued

A-[B-Ar-SO$_2$N(R$_1$)—Y]$_p$

| Entry | R$_1$ | Y | p |
|---|---|---|---|
| 1 | H | 9PO/1EO-Me | 1 |
| 2 | H | 6PO—CH$_2$CH(OH)CH$_2$OH | 1 |
| 3 | H | 2PO/14EO-Me | 1 |
| 4 | H | 3PO/19EO-Me | 1 |
| 5 | H | 9PO/1EO-Me | 1 |
| 6 | H | 31PO/3EO-Me | 1 |
| 7 | H | 2PO/10EO-Me | 1 |
| 8 | H | 15PO—CH$_2$CH(OH)CH$_2$OH | 1 |
| 9 | H | 2PO/14EO-Me | 1 |
| 10 | H | 31PO/3EO-Me | 1 |
| 11 | H | 3PO/19EO-Me | 1 |
| 12 | H | 10PO—CH$_2$CH(OH)CH$_2$OH | 1 |
| 13 | H | 2PO/12EO-Me | 1 |
| 14 | H | 3PO/19EO-Me | 1 |
| 15 | H | 3PO/19EO-Me | 1 |
| 16 | H | 9PO/3EO-Me | 1 |
| 17 | H | 2PO/10EO-Me | 1 |
| 18 | H | 2PO/7EO-Me | 2 |
| 19 | H | 1PO/3EO-nBu | 2 |
| 10 | H | 3PO/3EO—nC$_6$H$_{11}$ | 2 |

TABLE 22

A-[NHC$_2$H$_4$SO$_2$N(R$_1$)—Y]$_p$

| Entry | A | R$_1$ | Y | p |
|---|---|---|---|---|
| 1 | | H | 9PO/1EO-Me | 1 |

TABLE 22-continued

A-[NHC$_2$H$_4$SO$_2$N(R$_1$)—Y]$_p$

| Entry A | | R$_1$ | Y | p |
|---|---|---|---|---|
| 2 | 1-methylanthraquinone | H | 2PO/10EO-Me | 2 |
| 3 | 1-hydroxy-4-methylanthraquinone | CH$_3$ | 15PO—CH$_2$CH(OH)CH$_2$OH | 1 |
| 4 | 1-methyl-4-(p-tolylamino)anthraquinone | H | 3PO/19EO-Me | 1 |
| 5 | 1-(cyclohexylamino)-4-methylanthraquinone (S) | H | 10PO—CH$_2$CH(OH)CH$_2$OH | 1 |
| 6 | 1,4-dimethylanthraquinone | H | 2PO/14EO-Me | 4 |
| 7 | 1-methyl-4-[(4-tert-nonylphenyl)thio]anthraquinone | H | 3PO/19EO-Me | 1 |

TABLE 22-continued

A-[NHC$_2$H$_4$SO$_2$N(R$_1$)—Y]$_p$

| Entry | A | R$_1$ | Y | p |
|---|---|---|---|---|
| 8 | 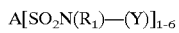 | C$_2$H$_5$ | 31PO/3EO-Me | 1 |

We claim:

1. A colored thermoplastic resin composition which comprises a thermoplastic resin and a colorant incorporated in and distributed throughout the mass of said thermoplastic resin while said resin is in a molten state, whereby said colorant is essentially non-extractable from said resin, said colorant has the formula:

A[SO$_2$N(R$_1$)—(Y)]$_{1-6}$ wherein A is an anthraquinone or condensed anthraquinone colored chromophoric radical;

Y is a polymeric substituent having from 4 to 200 residues selected from —CH$_2$CH$_2$O—, —CH$_2$CH(CH$_3$)O—, —CH$_2$CH(C$_2$H$_5$)O— and mixtures thereof, and the total of all said residues per colorant molecule is from 4 to 600; and R$_1$ is selected from hydrogen, Y, C$_{1-12}$ alkyl, aryl and cycloalkyl, or R$_1$ in combination with Y and N completes a 5–7 membered ring.

2. The colored resin composition of claim 1 wherein said resin is selected from polyolefin polymers and copolymers, polystyrenes, polycarbonates, ABS, polyvinyl chloride, polyvinylidene chloride, cellulosic resins, acrylic resins, polyamides and polyesters.

3. The colored resin composition of claim 2 wherein said colorant comprises from 0.001 to 3 wt. % of said resin composition.

4. The colored resin composition of claim 3 wherein A is selected from anthraquinones, anthrapyridones, anthrapyridines, anthrapyrimidines, phthaloylphenothiazines, 14H-naphtho(2,3-a)-phenothiazine-8,13-dione-S,S-dioxides, 1H-anthra(2,1-b)-(1,4)-thiazine-7,12-diones, 1H-anthra(2,1-b)-(1,4)-thiazine-7,12-dione-S,S-dioxides, phthaloylphenoxazines, benzathrones, phthaloylacridones, 8H-naphtho(2,3-c)-thiaxanthene-5,8,14-triones, anthrapyridazones, anthrapyrazoles, anthraisothiazoles, naptho(1',2',3':4,5)-quino(2,1-b)quinazoline-5,10-diones.

5. The colored resin composition of claim 1 wherein said resin is selected from polyolefin polymers and co-polymers, polyamides and polyesters.

6. The colored resin composition of claim 5 wherein said colorant comprises from 0.001 to 3 wt. % of said resin composition.

7. A colored thermoplastic resin composition which comprises a thermoplastic resin and a colorant incorporated in and distributed throughout the mass of said thermoplastic resin while said resin is in a molten state, whereby said colorant is essentially non-extractable from said resin, said colorant has the formula:

A[SO$_2$—X—(Y)$_{1-2}$]$_{1-6}$ wherein A is an anthraquinone or condensed anthraquinone colored chromophobic radical;

X is selected from the formulae:

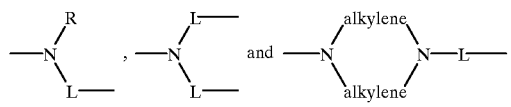

wherein R is hydrogen, alkyl, cycloalkyl, aryl or —Y;

L is a linking group selected from a covalent bond, alkylene, arylene, cycloalkylene, arylene-alkylene, alkylene-arylene-alkylene, alkylene-cycloalkylene, alkenylene, alkynylene, alkylene-Z-, arylene-Z-, aralkylene-Z-, alkylene-Z-alkylene-Z-, alkylene-Z-arylene-Z- or arylene-Z-arylene-Z-;

Z is selected from —O—, —S—, —SO$_2$—, —N(R$_2$)—, —SO$_2$—N(R$_2$)— or —CON(R$_2$)—; wherein R$_2$ is hydrogen, alkyl, aryl, cycloalkyl, or —Y;

Y is a polymeric substituent having from 4 to 200 residues selected from —CH$_2$CH$_2$O—, —CH$_2$CH(CH$_3$)O—, —CH$_2$CH(C$_2$H$_5$)O— and mixtures thereof, and the total of all said residues per colorant molecule is from 4 to 600; and wherein each of said alkyl, alkylene, alkenylene and alkynylene groups has from 1 to 12 carbon atoms.

8. The colored thermoplastic resin of claim 7 wherein Y is terminated at each occurrence with a moiety selected from hydrogen, alkyl, cycloalky, aryl, acyl, and

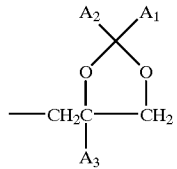

wherein each of A$_1$, A$_2$, and A$_3$ is independently selected from hydrogen, alkyl, and aryl; wherein each of said alkyl and acyl groups has from 1 to 12 carbon atoms.

9. The colored resin composition of claim 7 wherein said resin is selected from polyolefin polymers and copolymers, polystyrenes, polycarbonates, ABS, polyvinyl chloride, polyvinylidene chloride, cellulosic resins, acrylic resins, polyamides and polyesters.

10. The colored resin composition of claim 9 wherein said colorant comprises from 0.001 to 3 wt. % of said resin composition.

11. The colored resin composition of claim 10 wherein A is selected from anthraquinones, anthrapyridones, anthrapyridines, anthrapyrimidines, phthaloylphenothiazines, 14H-naphtho(2,3-a)-phenothiazine-8,13-dione-S,S-dioxides, 1H-anthra(2,1-b)-(1,4)-thiazine-7,12-diones, 1H-anthra(2,1-b)-(1,4)-thiazine-7,12-dione-S,S-dioxides, phthaloylphenoxazines, benzathrones, phthaloylacridones, 8H-naphtho(2,3-c)-thiaxanthene-5,8,14-triones, anthrapyridazones, anthrapyrazoles, anthraisothiazoles, naptho(1',2',3':4,5)-quino(2,1-b)quinazoline-5,10-diones.

12. The colored resin composition of claim 7 wherein said resin is selected from polyolefin polymers and co-polymers, polyamides and polyesters.

13. The colored resin composition of claim 12 wherein said colorant comprises from 0.001 to 3 wt. % of said resin composition.

* * * * *